United States Patent [19]

Plunkett, Jr.

[11] Patent Number: 4,488,274
[45] Date of Patent: Dec. 11, 1984

[54] REMOTE DICTATION TRANSCRIPTION SYSTEM

[75] Inventor: Luther C. Plunkett, Jr., Atlanta, Ga.

[73] Assignee: Lanier Business Products, Inc., Atlanta, Ga.

[21] Appl. No.: 354,600

[22] Filed: Mar. 4, 1982

[51] Int. Cl.³ .................. G11B 21/12; G11B 27/36
[52] U.S. Cl. .................................. 369/24; 179/6.01; 369/25; 369/28; 369/29
[58] Field of Search ............... 369/24, 25, 28, 29; 179/6.01

[56] References Cited

U.S. PATENT DOCUMENTS

| | | |
|---|---|---|
| 3,632,893 | 1/1972 | Bolick, Jr. et al. . |
| 3,647,985 | 3/1972 | Langendorf et al. ............... 369/29 |
| 3,725,589 | 4/1973 | Golden . |
| 3,758,726 | 9/1973 | Bolick, Jr. et al. . |
| 3,867,578 | 2/1975 | Uechi . |
| 3,965,484 | 6/1976 | Matz et al. . |
| 4,122,305 | 10/1978 | Fish et al. . |

FOREIGN PATENT DOCUMENTS 936814 9/1963 United Kingdom .

Primary Examiner—Robert L. Richardson
Attorney, Agent, or Firm—Jones & Askew

[57] ABSTRACT

A system for the remote transcription of recorded dictation comprising a remote transcription unit and a machine control unit capable of controlling a plurality of dictation recorders and transmitting recorded dictation signals from a selected one of the plurality of dictation recorders for transcription by the operator of the remote transcription unit. The remote transcription unit generates a guard tone together with any commands which require a recording media motion function. The machine control unit provides the recording media motion function for so long as the guard tone is continued to be received, and terminates the recording media motion function in the event that the guard tone is interrupted. The speed of playback of recorded dictation may be controlled by the operator at the remote transcription unit, which transmits a command to the machine control unit corresponding to the desired speed of playback selected.

18 Claims, 11 Drawing Figures

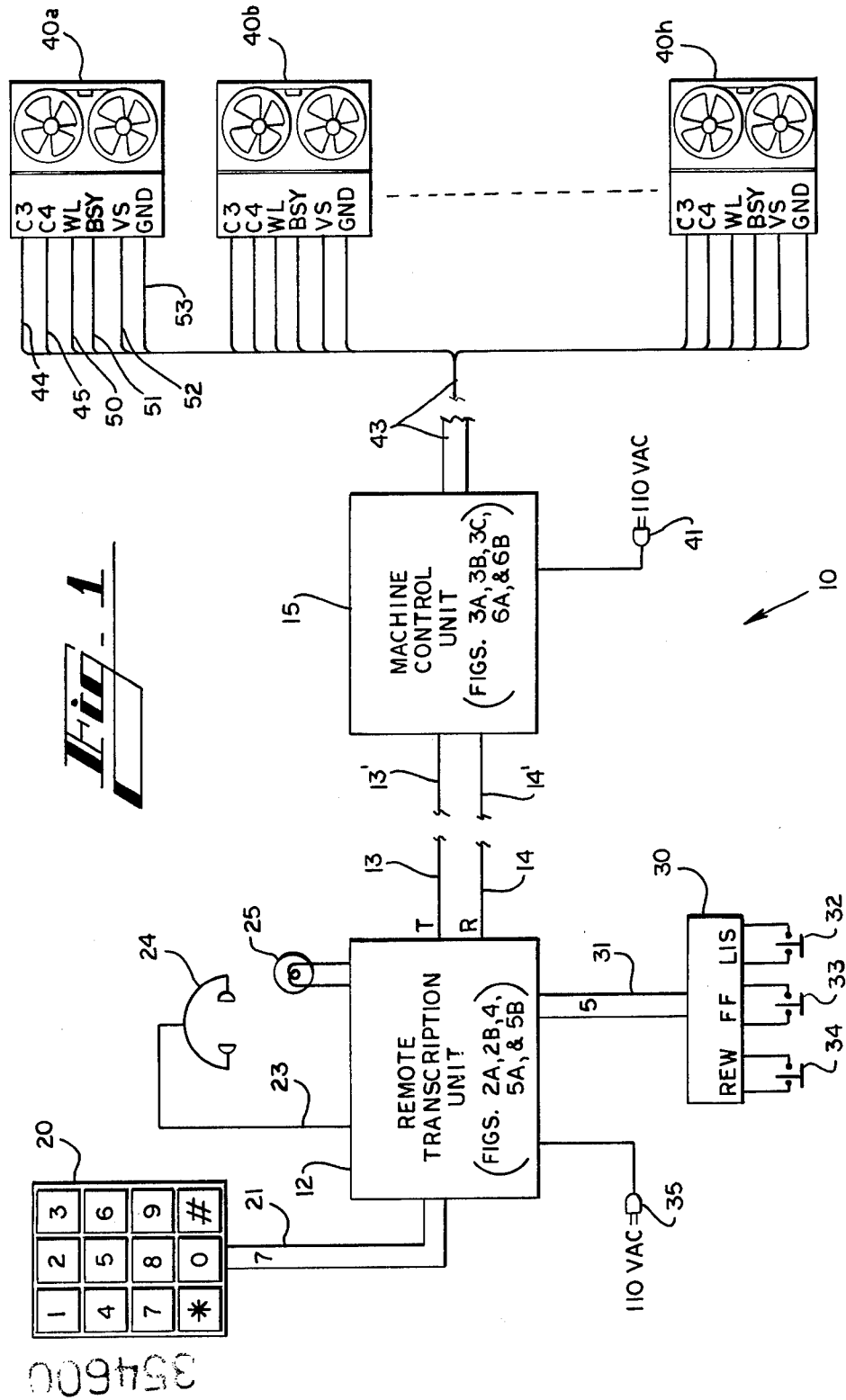

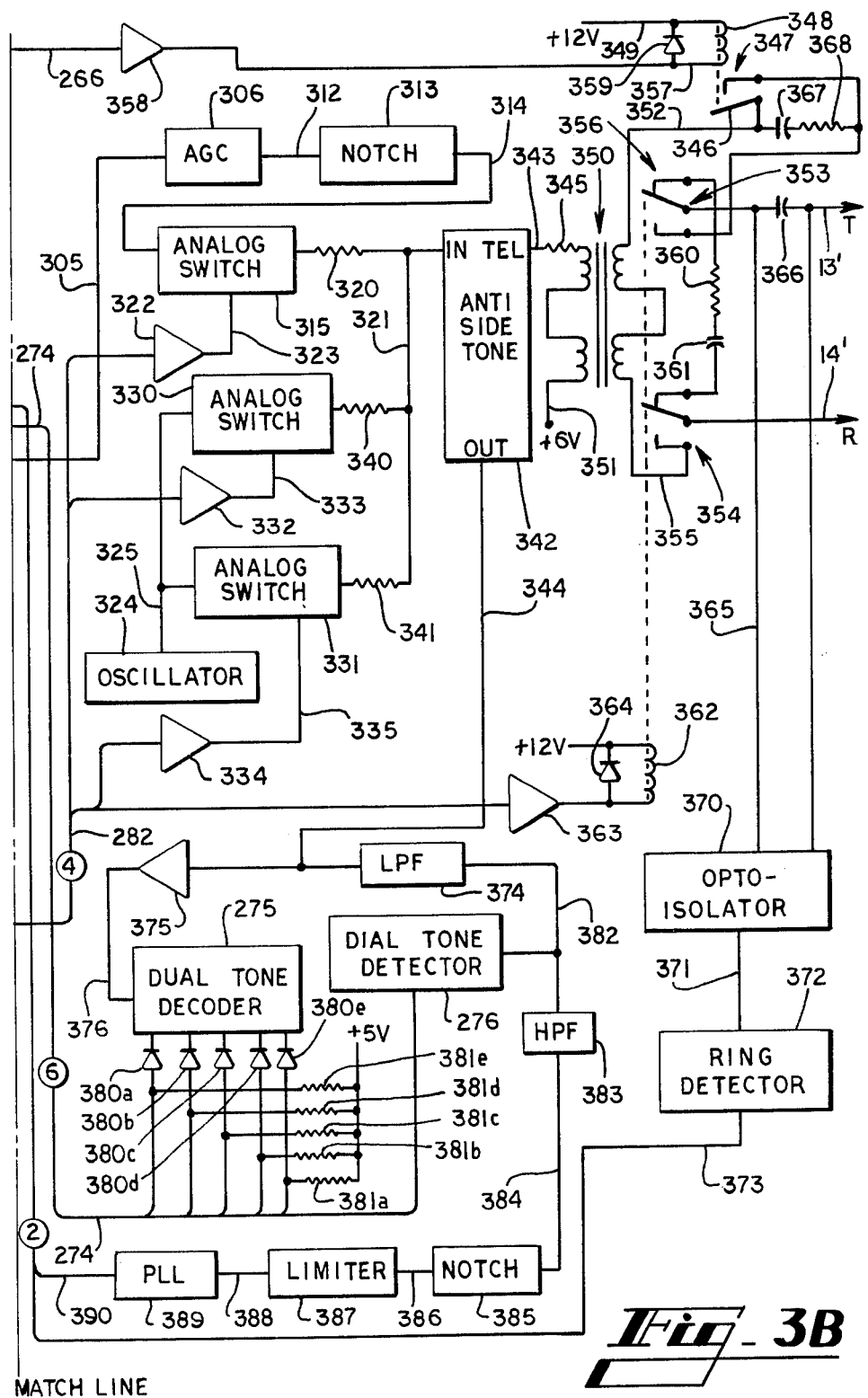
Fig_3B

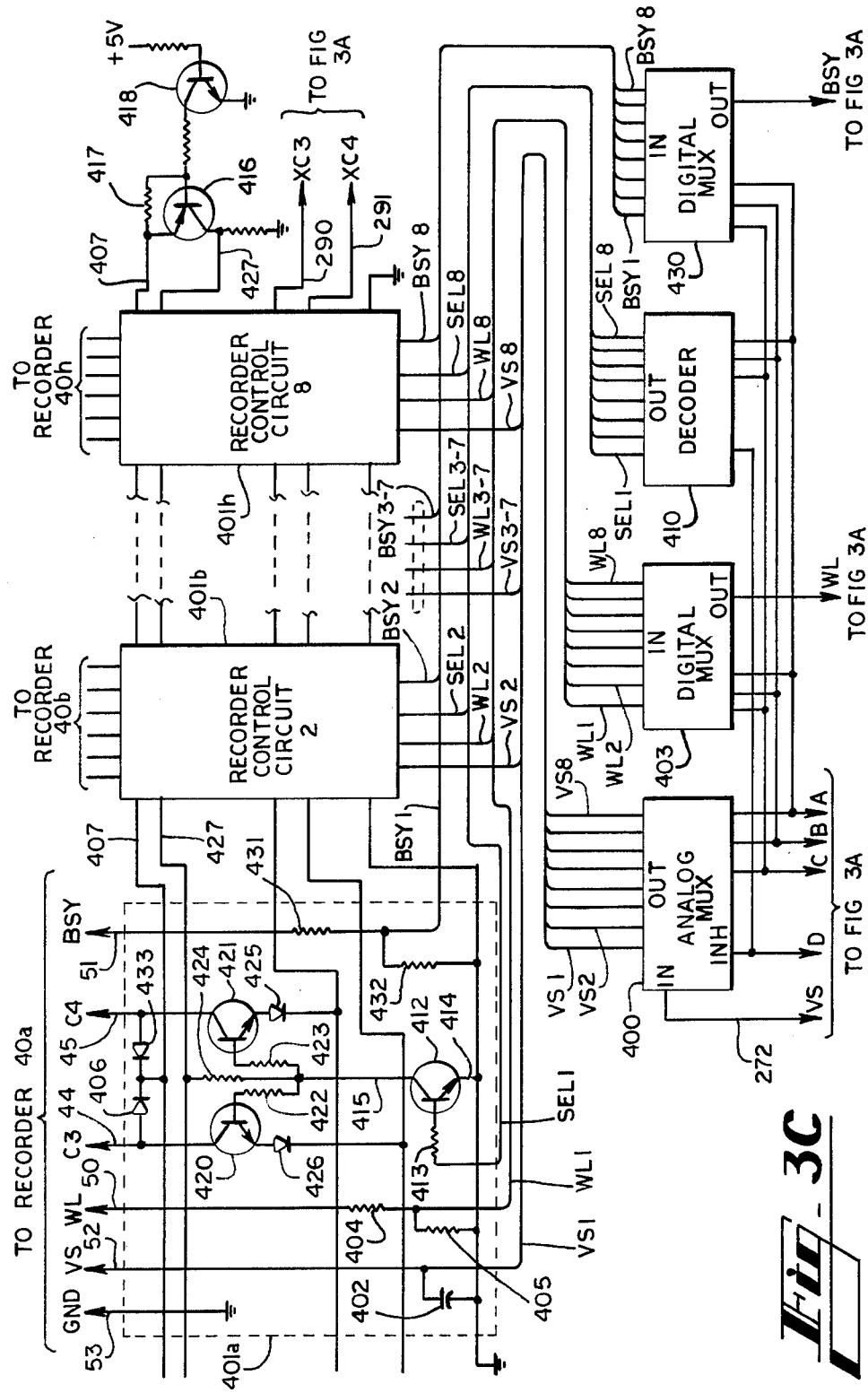

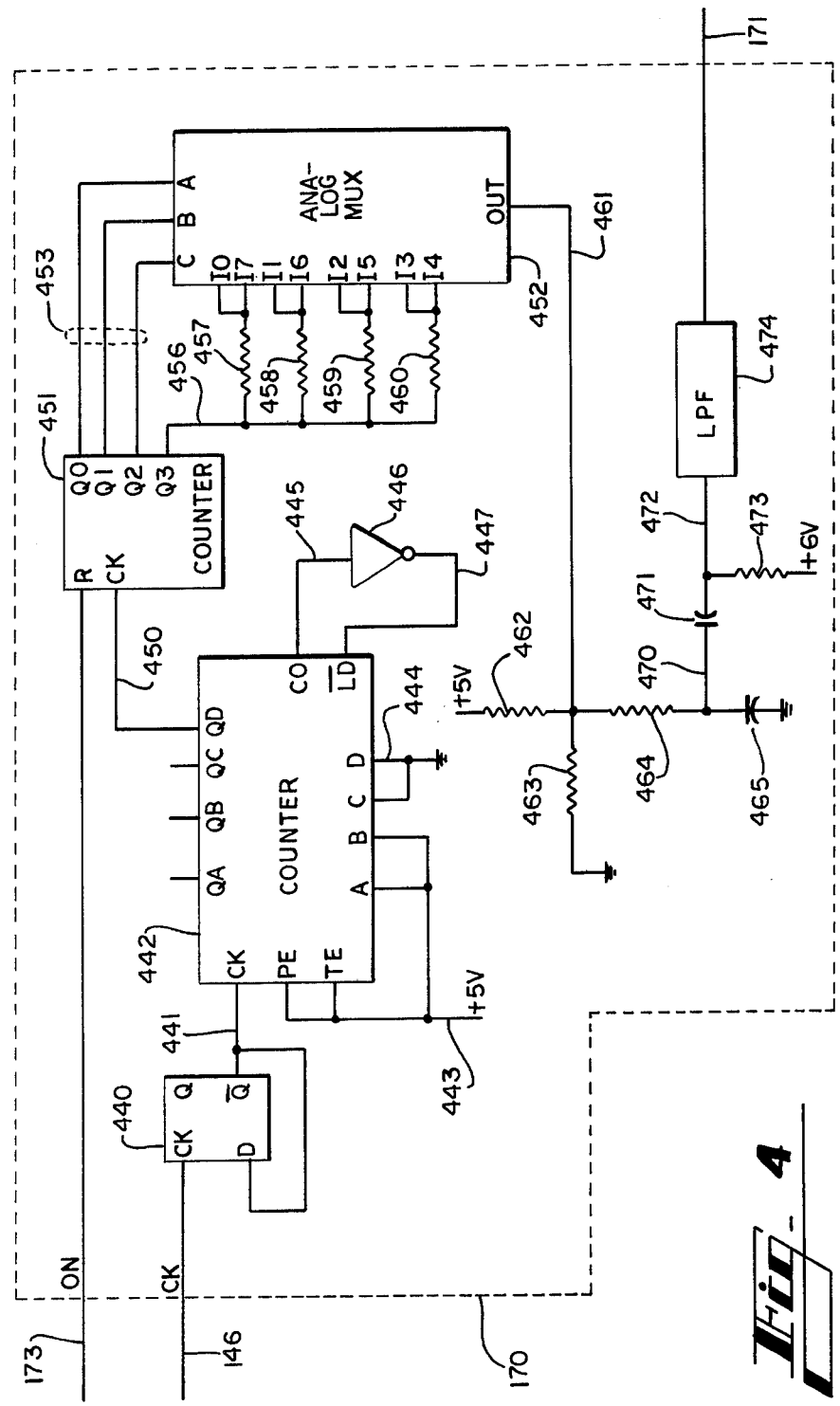

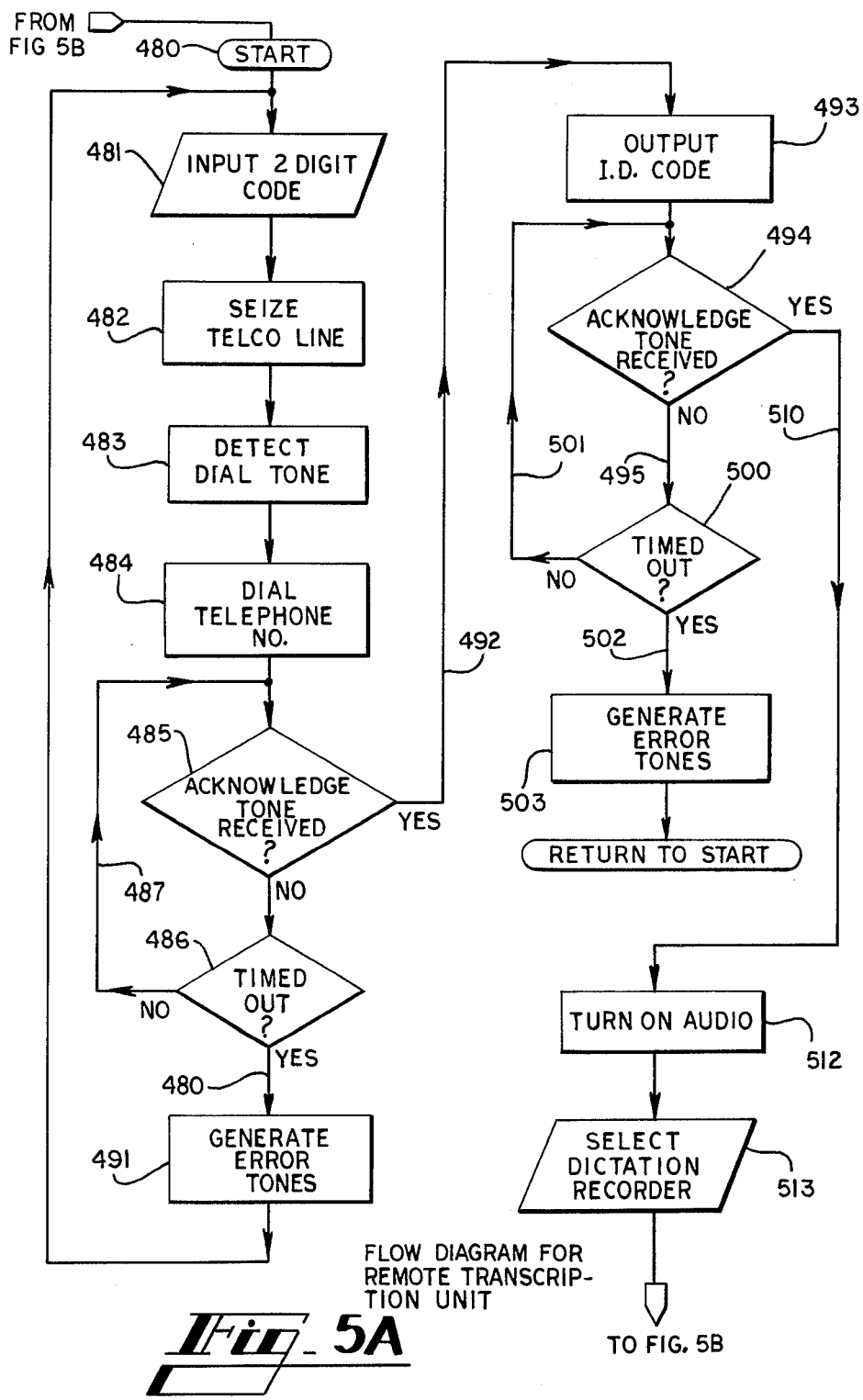
Fig. 5A  FLOW DIAGRAM FOR REMOTE TRANSCRIPTION UNIT

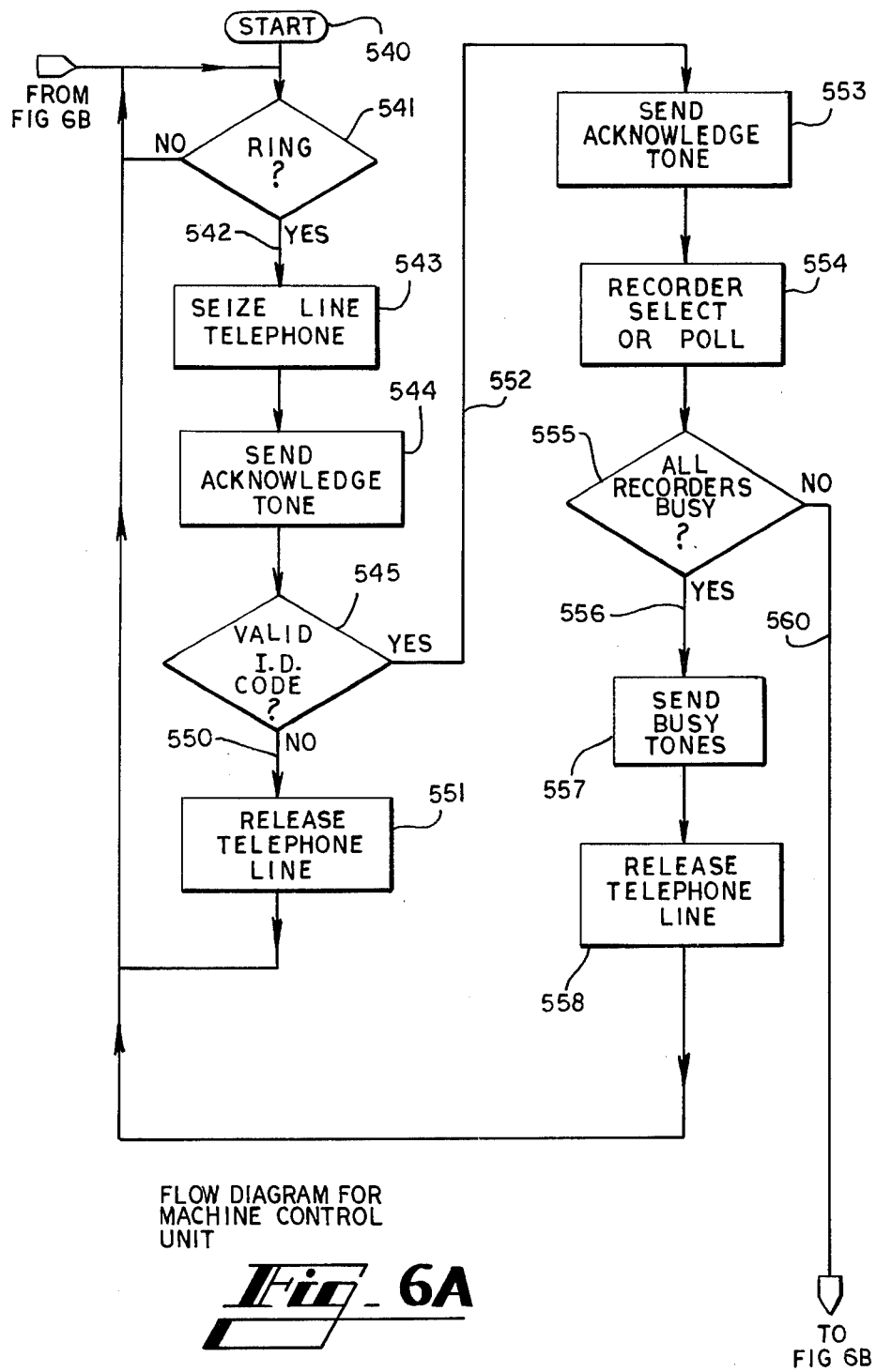
FLOW DIAGRAM FOR
MACHINE CONTROL
UNIT
Fig_6A

REMOTE DICTATION TRANSCRIPTION SYSTEM

BACKGROUND

1. Field of the Invention

The present invention relates in general to dictation transcription systems, and relates in particular to the art of remotely controlling, and receiving recorded dictation signals from, a preselected one of a plurality of dictation recorders containing recorded dictation.

2. Background of the Invention

Modern dictation systems have become increasingly complex in order to promote convenience and ease of dictation and transcription of the recorded dictation. Remote transcription of recorded dictation efficiently and conveniently is a problem which has seldom been addressed in the prior art. Devices for the remote control of dictation recorders, however, are known in the art and allow dictation to a dictation recorder which is located a distance from an operator. The patent to Fish, et al., U.S. Pat. No. 4,122,305, discloses a dictation machine control unit connected to a telephone transmission line and adapted to respond to signals received over the telephone line for controlling the operating functions of a dictation recorder. The functions of "record", "play back", "review", "stop", "correction mark", "end of letter mark", and "call attendant" are controlled in response to dual tone signals or dial pulse signals generated by a standard telephone instrument, so that an operator may dictate messages from a remote location.

Some of the same recorder functions controlled by the Fish device are desirable in remote dictation transcription systems. For remote transcription, as opposed to remote dictation, it is preferable to control the playback functions of a selected recorder containing recorded dictation from a remote transcription unit. Most often, foot pedals, rather than a conventional telephone instrument, are provided for functions which require movement of the recording media, such as listen, fast forward, and recall, so that the hands of the operator are free to type. In many conventional systems, the remote transcription unit provides a control signal over the telephone line to the selected recorder to initiate the desired function in response to the actuation of a foot pedal. For example, when the operator depresses a listen foot pedal, the recorder plays back the recorded dictation over the telephone line to the transcriptionist, who can hear the recorded dictation through a speaker, head phones, or the like. The transcriptionist then transcribes the recorded dictation.

In conventional central dictation/transcription systems, transcriber stations are connected by multiwire cables, through a switching network, to the recorder. In this type of environment, increased complexity of control functions may be implemented by either adding additional conductors to the connecting cables, or increasing the complexity of the signals placed on the cable. These alternatives cause no basic problem, other than increased complexity so long as the central system is situated so that the direct wired connections may be maintained.

These restraints have placed a practical limit on the distance that remote transcription stations can be placed from the recorders. In other words, in the prior art, it has been necessary to sacrifice sophistication of the functions controlled from a remote location as the distance from the recorders increases to the point at which a common carrier network, such as the telephone network, is used to connect recorder and transcriber. Thus, the basic problem to be solved by the present invention is that of maintaining the ability to provide all desired transcriber control functions over remote links, in particular telephone lines, when the links are basically audio links and the dictation/transcription system designer has no control over the DC voltages and currents on the link, and the link is characterized by a predetermined bandwidth.

In many conventional remote dictation transcription systems, the actuation of a control foot pedal provides a control signal to the recorder which merely initiates the desired function. When the function is to be terminated, a separate termination signal is generated at the remote transcription unit and transmitted via the telephone line to the dictation recorder which terminates the function upon receipt of the termination signal. In systems of this type, the interruption of communication, or the malfunction of the remote transcription unit, may result in the failure of the selected dictation recorder to receive the command to terminate a function which has been initiated. The dictation recorder thus experiences "runaway" by continuing to provide the selected function until the recording media has reached the limitations of its movement. For example, should the telephone line accidentally be disconnected after the provision of a fast forward control signal, a magnetic tape dictation recorder would continue to fast forward until the end of the tape has been reached. Consequently, it would be difficult for the transcriptionist to later determine the point on the tape at which transcription was interrupted without reviewing a large portion of the tape.

The Fish device described above seeks to prevent run-away by detecting the presence of a dial tone on the telephone line. A disconnect sequence which terminates the on-going function is triggered by the dial tone which appears if the telephone line has been disconnected. However, many telephone central offices do not transmit a dial tone upon the line of a receiving party within a consistent or standard time period. Thus, significant run-away may still occur during the time period between disconnection and the appearance of a dial tone.

Other problems exist in providing a convenient and efficient system for the remote transcription of recorded dictation. Often, an experienced transcriber desires to listen to the recorded dictation at a higher speed than is normally provided during playback. Similarly, a novice transcriptionist often desires for the playback of dictation to be at a slower speed than is normally provided. It is known in the art to provide means for selectably varying the speed of playback in directly connected systems. However, previous remote transcription systems have not had the capability to provide a speed of playback which is remotely selectable over a communications link. The Fish device described above does not teach or disclose any techniques for remotely controlling the speed of playback of recorded dictation.

During the transcription of recorded dictation, often it is also desirable for there to be an overlap in playback between dictation previously transcribed and dictation to be transcribed so that the operator can easily identify the point at which transcription ended. In many prior art devices, when the transcriptionist releases the "listen" foot pedal, a predetermined backspace or "recall" of the recorded dictation is automatically provided so as to allow the overlap in playback. Devices which provide the overlap function in the prior art often employ a circuit which automatically backspaces the tape a predetermined amount based upon the timing of a timing circuit. For example, the patents to Bolick et al., U.S. Pat. Nos. 3,632,893 and 3,758,726 employ capacitor charging circuits to provide the timing function. The Fish device described above also employs such a scheme for providing a fixed amount of backspace. However, different transcriptionists often desire different amounts of recall to suit their temperaments, speed and abilities. It has not been possible to remotely provide a remotely selectable variable amount of backspace in devices employing such capacitor charging timing circuits.

SUMMARY OF THE INVENTION

The present invention provides a remote dictation transcription system, which upon the transmission of a recording media motion function-initiating control signal to a central dictation recorder control unit generates a guard tone that continues during the provision of the function. The machine control unit, which controls a plurality of dictation recorders, is responsive to the guard tone and terminates the function initiated by the control signal when the guard tone is no longer received from the remote transcription unit.

The present invention further includes apparatus for remotely selecting the speed of playback of a selected dictation recorder, and for remotely selecting the amount of automatic recall from the remote transcription unit. The operator at any time may enter a sequence of commands which corresponds to a selected increased or decreased speed of playback, and the machine control unit automatically provides the selected speed when recorded dictation is played back until the speed is changed again. In a similar fashion the operator at any time may enter commands which increase or decrease the amount of recall which occurs automatically every time the listen foot control pedal is released.

Additionally, the present invention includes means for providing a "monitor" function, which polls the plurality of dictation recorders and automatically calls the remote transcriptionist when a dictation recorder has recorded dictation ready to be transcribed. The machine control unit may be programmed to automatically dial the remote transcription unit and cause a light to flash as a signal to the operator. Alternatively, if the operator has dialed the machine control unit and all dictation recorders are either busy recording or are empty, the operator can enter a command which causes the machine control unit to dial the remote transcription unit and flash the operator.

Consequently, it is an object of the present invention to provide an improved remote dictation transcription system.

It is another object of the present invention to provide a remote dictation transcription system which automatically terminates a dictation recorder function involving recorder media motion if the communication link between the remote transcription unit and the dictation recorder machine control unit is interrupted.

It is another object of the present invention to provide a remote dictation transcription system which continuously generates and transmits a guard tone to a selected dictation recorder after the provision of a control signal.

It is another object of the present invention to provide a remote dictation transcription system which terminates a selected function being provided by a dictation recorder in the event that a guard tone from a remote transcription unit is terminated.

It is another object of the present invention to provide a remote dictation transcription system which allows the transcriptionist to remotely select the speed of playback of the recorder from which dictation is being transcribed.

It is another object of the present invention to provide a remote dictation transcription system which automatically sets the speed of playback of recorded dictation for transcription to a predetermined speed of playback but which may be increased or decreased by an operator at a remote location.

It is another object of the present invention to provide a remote dictation transcription system which provides a selectable recall function that may be varied in amount of recall by an operator at a remote location.

It is another object of the present invention to provide a remote dictation transcription system which automatically calls the remote transcriptionist when there is recorded dictation available for transcription.

These and other objects and advantages of the present invention will be more apparent by reference to the following description of a preferred embodiment of the present invention and by reference to the attached drawings.

BRIEF DESCRIPTION OF THE DRAWINGS

FIG. 1 is a block diagram of a preferred embodiment of the remote dictation transcription system of the present invention.

FIGS. 3A, 3B, and 3C are schematic diagrams of a preferred embodiment of the machine control unit of shown in FIG. 1.

FIG. 4 is a schematic diagram of a preferred embodiment of the guard tone generator shown in FIG. 2B.

FIGS. 5A and 5B are functional flow diagrams of the operation of the remote transcription unit shown in FIGS. 2A and 2B.

FIGS. 6A and 6B are functional flow diagrams of the operation of the machine control unit shown in FIGS. 3A, 3B, and 3C.

DETAILED DESCRIPTION OF THE PREFERRED EMBODIMENT

I. THE REMOTE TRANSCRIPTION SYSTEM

Figure 2A:
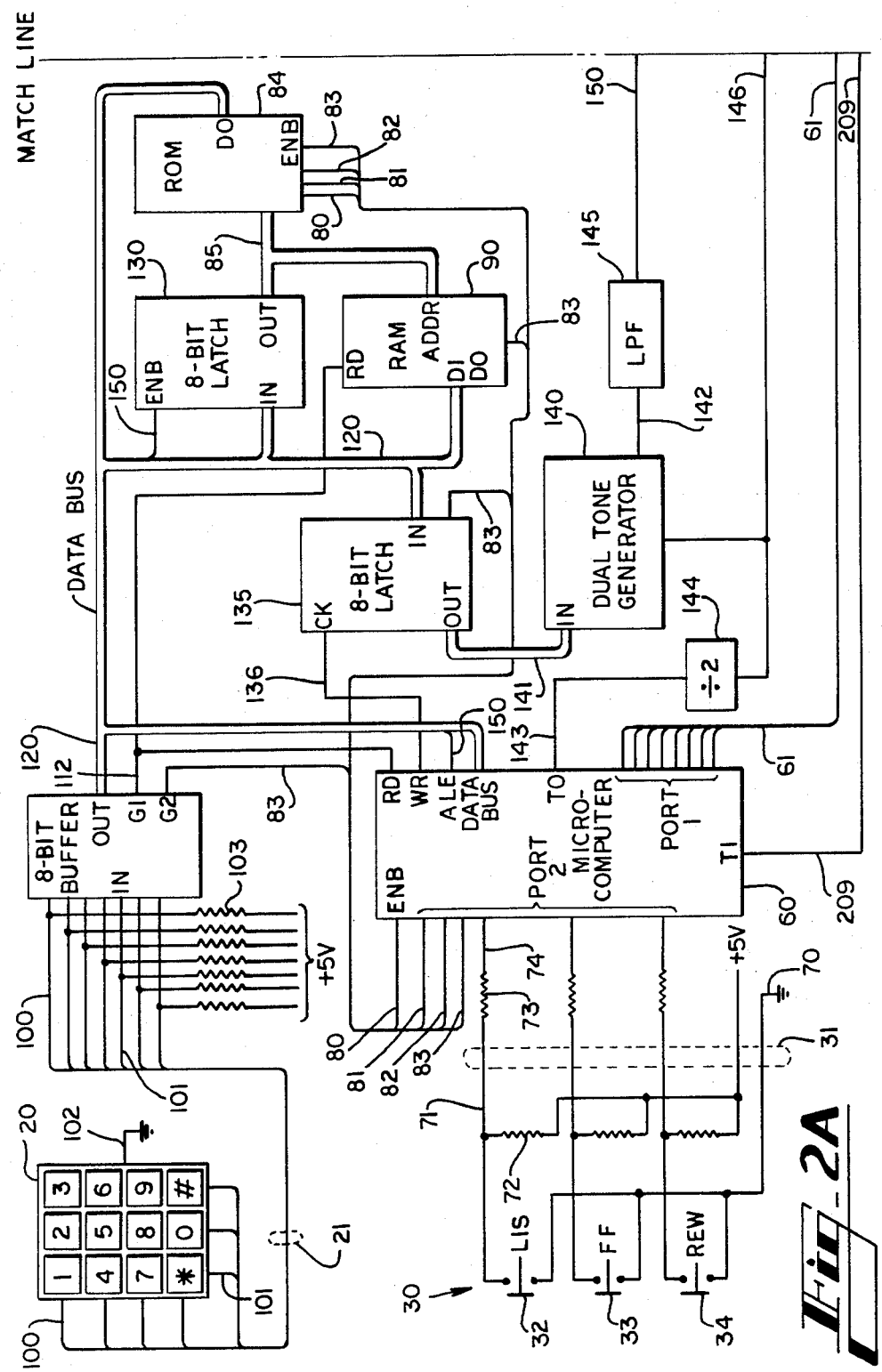
FIGS. 2A and 2B are schematic diagrams of a preferred embodiment of the remote transcription unit of the system shown in FIG. 1.

Referring now to the drawings, in which like numerals indicate like parts throughout the several drawings, FIG. 1 shows a block diagram of a preferred embodiment of the remote dictation transcription system of the present invention. The system comprises a remote transcription unit 12 is connected by a telephone line 13, 14 to machine control unit 15, which is capable of controlling a plurality of dictation recorders. It will be appreciated that the telephone line is a conventional telephone line comprising a tip line 13 and a ring line 14 emanating from the remote transcription unit, and a tip line 13' and a ring line 14' connected to the machine control unit.

Remote transcription unit 12 comprises a conventional dual tone generating key pad 20, which generates in a known manner a row signal and a column signal corresponding to the particular key depressed on the pad. It will be understood that four row signals and three column signals comprise the standard output signals of key pad 20, which are provided over seven lines 21 to remote transcription unit 12. The key pad is used by the transcriptionist cause the remote transcription unit to generate certain control signals over the telephone line to the machine control unit.

A particular sequence of depressions of keys of key pad 20 may be used to initiate one of a number of functions which the system is capable of performing. For example, different sequences of keys may be used to cause the system to seize the telephone line and dial the machine control unit 15 over the telephone transmission line, to access a particular one of a plurality of dictation recorders controllable by machine control unit 15, to command the machine control unit to "monitor" the dictation recorders and call the transcriptionist when dictation is ready to be transcribed, to set the amount of variable backspace or "recall", to set the speed of play back of the dictation recorder which has been selected, or to provide a signal that all of the dictation on the selected recorder has been transcribed so that the telephone transmission line may be released or "hung up" thereby terminating the connection between remote transcription unit 12 and machine control unit 15. Other functions and features may be initiated by a particular sequence of depressions of keys, as will be appreciated by those skilled in the art.

Remote transcription unit 12 has an audio output which is provided on line 23 to a headset 24 which converts the audio output into audible signals. A lamp 25 is connected to the remote transcription unit and is illuminated during seizure of the telephone line, thereby providing a visual indication to the transcriptionist that the unit has seized the telephone line. The lamp may also be "flashed" as a visual signal to the operator, as for example when the "monitor" feature has been selected.

A foot pad 30 housing several foot control switches is connected by lines 31 to the remote transcription unit 12. The foot control switches employed in the preferred embodiment include a listen switch 32, a fast forward switch 33, and a rewind switch 34. It will be understood that foot pad 30 comprises conventional foot-actuated switches which when depressed provide a control signal corresponding to the particular switch depressed.

Power is provided to the remote transcription unit 12 by means of a standard 110 volts AC power connection 35. It will be understood that a conventional power supply is employed to provide power to the particular components of the remote transcription unit at the voltage levels required by the components.

It is to be understood that remote transcription unit 12 is to be placed in a location remote from the placement of machine control unit 15 and the dictation recorders controlled thereby. In the preferred embodiment disclosed herein, machine control unit 15 is configured to provide control signals to, and receive status signals and audio output signals from, a plurality of recorders 40a, 40b, . . . 40h. A typical conventional dictation recorder such as 40a has multi-purpose terminals C3, C4 upon which control signals and recorded dictation signals are superimposed during playback. Recorder 40a further provides a workload status output WL (which indicates that recorded dictation is available for transcription), a busy status output BSY (which indicates that the recorder is not presently available), together with a variable speed input VS (which controls the speed of playback of the recorded dictation). Finally, the dictation recorder 40a includes a ground connection GND. It will be appreciated by those skilled in the art that the present invention may easily be adapted to control the functions of other types of dictation recorders having different inputs and outputs.

Power is provided to machine control unit 15 through 110 volts AC power connection 41 to a conventional power supply (not shown). A typical dictation recorder such as dictation recorder 40a is connected to machine control unit 15 by means of several separate lines. Lines 44, 45 are connected to the C3 and C4 terminals of recorder 40a, which provides the audio output of the recorder and receives control signals coupled by machine control unit 15 onto the lines. The manner in which control signals are coupled onto lines 44 and 45 will be discussed in greater detail in connection with FIG. 3B. Lines 50 and 51, respectively, carry the workload status output signal WL and the busy status output signal BSY from the recorder to machine control unit 15. Line 52 provides the speed control signal VS from the machine control unit to the VS input of the dictation recorder, and it will be understood that the voltage level of the signal provided on line 52 controls the speed at which the dictation recorder will play back recorded dictation. Line 53 provides a ground connection between the GND input of recorder 40a and machine control unit 15.

It will be appreciated that the preferred embodiment of machine control unit 15 is capable of providing and receiving inputs and outputs from up to eight dictation recorders, and that each dictation recorder provides and receives signals similar to dictation recorder 40a. In the apparatus disclosed herein, only one dictation recorder may be accessed by machine control unit 15 at any given time. However, any dictation recorder which is not being controlled by machine control unit 15 to transcribe recorded dictation may be used by detectors to record dictation without interference with the transcription of dictation from the dictation recorder controlled by the machine control unit.

II. THE REMOTE TRANSCRIPTION UNIT

Figure 2B:
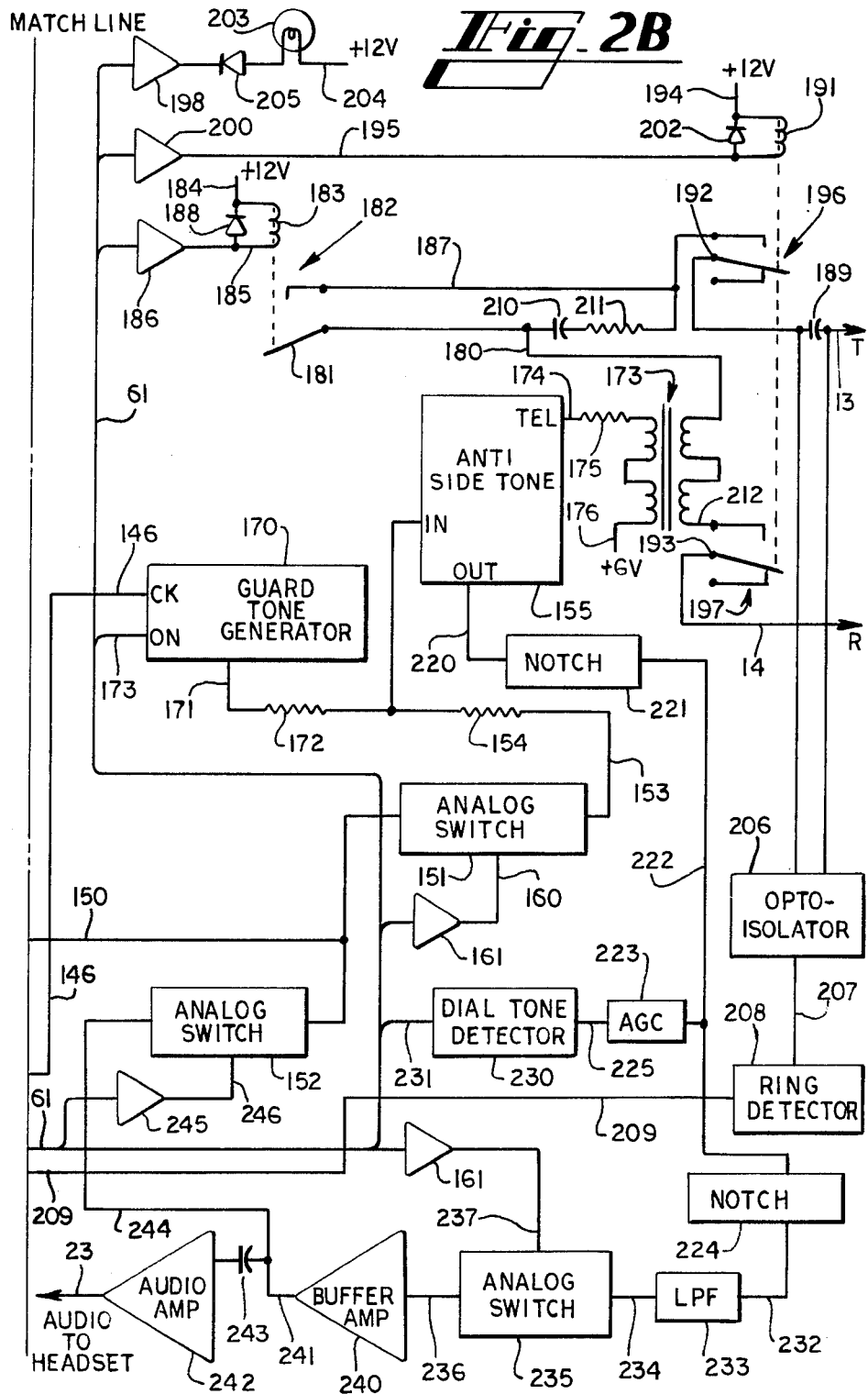

Referring now to FIGS. 2A and 2B, more detailed diagram of the preferred embodiment of remote transcription unit 12 is illustrated in more detail. The remote transcription unit contains the circuitry for receiving signals from key pad 20, receiving signals from listen switch 32, fast forward switch 33, and rewind switch 34, providing an audio output on line 23, and communicating over telephone lines 13 and 14 with the machine control unit 15 which is located remotely from transcription unit 12. The preferred embodiment of the remote transcription unit comprises combined digital and analog circuitry which control the various functions performed by the remote transcription unit. A microcomputer 60, shown in FIG. 2A, having a plurality of input and output ports and capable of sending and receiving digital signals over a bi-directional data bus, is employed in the preferred embodiment to coordinate the various functions of the remote transcription unit. A conventional microcomputer circuit chip such as the type 8039 8-bit microcomputer manufactured by Intel Corporation, Santa Clara, Calif., is used in the preferred embodiment for microcomputer 60. Microcomputer 60 includes bidirectional input and output port PORT1 which sends and receives digital signals over line 61, which will be discussed in more detail hereinbelow. A similar bidirectional input and output port PORT2 is included in microprocessor 60 and is also capable of sending and receiving digital signals. It will be appreciated by those skilled in the art that PORT1 and PORT2 of microcomputer 60 are capable of providing digital output signals and receiving digital input signals under control of the program for microcomputer 60.

The operator of remote transcription unit 12 may cause control signals to be sent to a selected dictation recorder by actuating listen switch 32, fast forward switch 33, or rewind switch 34, as desired. Should the operator actuate listen switch 32, the terminals of listen switch 32 will close and connect line 71 to ground line 70, thereby placing a logical "0" on line 74, which is connected to an input of PORT2 of microprocessor 60. Resistor 72, which is connected to a 5 volt power source, and resistor 73 provide pull-up and microcomputer input protection functions, respectively. Thus, it will be appreciated that microcomputer 60 can detect the actuation of listen switch 32 by reading line 74 on PORT2, and can thereafter provide the appropriate control function in response thereto.

In a manner similar to listen switch 32, fast forward switch 33 and rewind switch 34 are connected to input lines of PORT2 of microcomputer 60. It will be appreciated that microcomputer 60 can similarly detect the actuation of these control switches by reading PORT2 and can provide the appropriate control functions in response thereto. It will be understood that microcomputer 60 is programmed to provide selected control functions in response to the actuation of listen switch 32, fast forward switch 33, or rewind switch 34 at an appropriate time in the sequence of operation of remote control unit 12, which is described in detail in FIGS. 5A and 5B.

Lines 80, 81, 82, and 83 are connected to PORT2 of microcomputer 60 and provide control and address signals to read-only memory (ROM) 84, which in the preferred embodiment is an erasable programmable read-only memory for containing the program for microcomputer 60. ROM 84 preferably comprises a 2,048 word by 8-bit word memory such as the type 2716 erasable programmable ROM manufactured by Intel Corporation of Santa Clara, Calif. In order to access 2,048 words of program information, eleven address lines are required. In addition to control and address lines lines 80, 81, 82 and 83, 8 bits of address information are provided to ROM 84 over 8-bit bus 85. Bus 85 also provides eight address lines for random access memory (RAM) 90. It will be appreciated by those skilled in the art that microcomputer 60 provides a memory enable control signal on line 80 which causes ROM 84 to place data stored at the address present on bus 85 onto bus 120.

As described above in connection with FIG. 1, the operator of the remote transcription unit 12 may provide control commands to the remote transcription unit by means of key pad 20, which in the preferred embodiment comprises a conventional four row, three column key pad. Depression of a key on key pad 20 results in the selection of a line corresponding to the row in which the key is located, and a line corresponding to the column in which the key is located. For example, in FIG. 2A, depression of the "1" key results in the connection of line 100 and line 101 to ground line 102. Thus, a logical "0" appears on lines 100 and 101 as a result of the depression of the "1" key of key pad 20. A pull-up resistor 103 is connected between a five volt power source and line 100. It will be appreciated that each of the seven row and column lines 21 are pulled up with a pull-up resistor similar to resistor 103.

The row and column lines 21, including lines 100 and 101, are connected to the input of 8 bit buffer 110. In the preferred embodiment, buffer 110 is a conventional tri-state 8-bit buffer such as the type 81LS95 manufactured by National Semiconductor Corporation, Santa Clara, Calif. Buffer 110 transfers the signals on lines 21 to its output when enabled by a logical "0" "read" signal on line 112 (which connects the "read" output RD of microcomputer 60) and a logical "0" on line 83 (which is connected to an output of PORT2 of microcomputer 60). The output lines of buffer 110 are in turn connected to an 8-bit bidirectional data bus 120. Microcomputer 60 causes buffer 110 to connect lines 21 to data bus 120 under control of the microcomputer program.

In the preferred embodiment, microcomputer 60 is programmed to "poll" key pad 20 at period intervals by placing a read signal on line 112. This results in the transfer of the row and column lines 21 to data bus 120, so that microcomputer 60 may determine which key has been depressed. It will be appreciated that microcomputer 60 is programmed to interpret a sequential combination of keys of the key pad, as a command to provide a desired function.

Data bus 120 is also connected to the data output (DO) of ROM 84 and the data inputs (DI) and outputs (DO) of RAM 90. Data bus 120 is also connected to the input lines of 8-bit buffer 130, which is used to hold an address that is to be transferred to bus 85 and thence to ROM 84 and RAM 90 under control of microcomputer 60. Data bus 120 is also connected to the input lines of latch 135, which is used to hold an 8-bit data word for dual tone generator 140, discussed in greater detail below.

Microcomputer 60 receives its program instructions over data bus 120 from ROM 84. The address latch enable (ALE) output of microcomputer 60 is provided on line 150 to the enable (ENB) input of latch 130 so as to enable latch 130 to transfer the data on data bus 120 to bus 85. Thus, it will be appreciated that by providing an address on data bus 120 (through latch 130) and lines 80–83, microcomputer 60 provides addresses to ROM 84, which in response provides program instructions back to microcomputer 60 on bus 120.

RAM 90 is used to store digital information such as the telephone number at which machine control unit 15 may be reached. The information which corresponds to this telephone number may be retrieved upon request by microcomputer 60 under program control. In the preferred embodiment, the actuation of a particular sequence of keys on key pad 20 causes microcomputer 60 to read the contents of RAM 90 over data bus 120 and transfer this information to latch 135. Microcomputer 60 performs this function by placing a signal on line 112 from the RD output of microcomputer 60 together with a signal on line 83, to poll buffer 110 to determine if a switch has been actuated. This polling of the key pad is repeated until microcomputer 60 ascertains that a sequence of key pad depressions has been received which corresponds to a command to call the machine control unit.

After microcomputer 60 has determined that it has received a command to call the machine control unit, the microcomputer then places a series of addresses on data bus 120 which through latch 130 provides an address on bus 85 to RAM 90. This address corresponds to the storage location of the telephone number of the machine control unit. When the data stored in RAM 90 is made available on data bus 120, microcomputer 60 reads the contents of RAM 90 onto data bus 120 by placing a logical "0" on line 112 together with a logical "1" on line 83. Microcomputer 60 then clocks the data on data bus 120 to latch 135 by actuating the write output WR on line 136, which is connected to the clock input CK of the latch. This causes latch 135 to store the digital information received on bus 120.

The information stored in latch 135, which represents the telephone number of the machine control unit, is transferred from latch 135 to 8-bit bus 141, which is connected to dual tone generator 140. Thus, an 8-bit digital word is provided to dual tone generator 140, which in the preferred embodiment is a conventional telephony dual tone pair generator such as the type 14410 manufactured by Motorola, Inc. of Phoenix, Ariz. The output of dual tone generator 140 is coupled onto the telephone line and may be used to dial up the machine control unit. Thus, it will be appreciated that the depression of keys of key pad 20 in an appropriate sequence may be interpreted by microcomputer 60 to cause digital information corresponding to the telephone number of the machine control unit to be placed on the input lines of dual tone generator 140. It will also be appreciated that microcomputer 60 may cause dual tone generator 140 to generate other sequences of dual tone pairs which correspond to information such as an identification signal of the remote transcription unit.

Those skilled in the art will recognize that dual tone generator 140 causes the generation of a pair of tones on line 142 in response to certain inputs on line 141. Those skilled in the art will further recognize that microcomputer 60 is capable of providing at the TO output on line 143 a clock output which may be used in other portions of the circuit to which the microcomputer is connected. In the preferred embodiment, microcomputer 60 provides a two megahertz signal the TO output at such time as it is desired for dual tone generator 140 to generate a dual tone pair. The two megahertz clock signal is provided on line 143 to divide-by-two circuit 144, which will be appreciated by those skilled in the art as being a conventional digital divide-by-two circuit. The output of divide-by-two circuit 144, a one megahertz signal, is provided on line 146 to dual tone generator 140. The one megahertz output of divide-by-two circuit 144 is required to generate dual tone pairs having frequencies usable in connection with conventional telephone dual tone pair systems, as will be appreciated by those skilled in the art.

Still referring to FIG. 2A, the output of dual tone generator 140 is provided on line 142 to low pass filter 145. Low pass filter 145 is a conventional active low pass filter tuned to pass frequencies in the telephony audio bandwidth. The output of low pass filter 145 is provided over line 150 to analog switch 151 and analog switch 152, shown in FIG. 2B. In the preferred embodiment, analog switches 151 and 152 comprise COS/MOS quad bilateral switches such as the type CD4066B manufactured by RCA Corporation, Somerville, N.J. The output of analog switch 151 is provided on line 153 and is connected through impedance-matching resistor 154 to the input IN of antisidetone circuit 155, which is discussed in more detail hereinbelow. Analog switch 151 switches the signal from low pass filter 145 to line 153 when a control signal is received on line 160. Microcomputer 60 provides a control signal for analog switch 151 over one of the PORT1 lines 61, shown in FIG. 2A. A certain one of these PORT1 lines is provided to the input of buffer 161, shown in FIG. 2B, so that microcomputer 60 controls buffer 161 and thus analog switch 151. It will be appreciated by those skilled in the art that the dual tone pair of dual tone generator 140 appears at the input of antisidetone circuit 155 when a control signal from microcomputer 60 causes buffer 161 to provide a control signal to analog switch 151 on line 160.

The output of divide-by-two circuit 144, in FIG. 2A, is also provided on line 146 to the clock input CK of guard tone generator 170, shown in FIG. 2B. Guard tone generator 170 is discussed in detail in connection with FIG. 4, hereinbelow. In FIG. 2B, the output of the guard tone generator is provided over line 171 through impedance matching resistor 172 to the input of antisidetone circuit 155. Guard tone generator 170 provides a guard tone which is a function of the one megahertz signal provided on line 146. Microcomputer 60 causes guard tone generator 170 to provide an output signal on line 171 by providing a control signal over one of the PORT1 lines 61 to line 173 and thus to the ON input of guard tone generator 170. Thus, it will be appreciated that microcomputer 60 controls the provision of the guard tone by guard tone generator 170.

In the preferred embodiment, microcomputer 60 causes guard tone generator 170 to provide a guard tone on line 171 and thus to antisidetone circuit 155 during all times that a recording media motion function has been selected by listen switch 32, fast forward switch 33, or rewind switch 34. As will be discussed hereinbelow, machine control unit 15 only allows a media motion function during such times as it detects the presence of a guard tone.

Antisidetone circuit 155, seen in FIG. 2B, is a conventional telephony circuit which, as will be appreciated by those skilled in the art, suppresses at its output OUT the magnitude of the signal received on its input IN. The telephone line terminal TEL of antisidetone circuit 155 is connected to the input of a telephone coupling transformer 173. As will be appreciated by those skilled in the art, transformer 173 is a conventional telephony transformer which couples standard telephone lines to circuitry with which the telephone lines are intended to function. The TEL terminal of antisidetone circuit 155 is connected through line 174 and resistor 175 to one of the primary winding terminals of transformer 173. A six volt power supply is provided on line 176 to the other primary winding terminal of transformer 173. It will be appreciated by those skilled in the art that signals received from a telephone line that is connected to the secondary winding terminals of tranformer 173 are provided over the OUT output of antiside tone circuit 155 on line 220. It will further be appreciated by those skilled in the art that a signal provided on the IN input of antisidetone circuit 155 is provided at the TEL terminal for transmission over the telephone line to which the secondary winding of transformer 173 is connected and is attenuated at the OUT output of antisidetone circuit 155.

One terminal of the secondary winding of transformer 173 is provided over line 180 to a contact 181 of relay 182. The other contact of relay 182 is provided on line 187. In the preferred embodiment, relay 182 is used to provide standard dial pulses compatible with conventional telephony equipment. Relay 182 is actuated by coil 183. One terminal of coil 183 is connected to a suitable twelve volt power source on line 184, and the other terminal is connected by line 185 to the output of a conventional buffer driver 186. Diode 188 suppresses transients between lines 184 and 185 of coil 183 in the known manner. Microcomputer 60 actuates relay 182 by providing a control signal from one of the PORT1 outputs over one of the lines 61 to the input of driver 186. It will be appreciated by those skilled in the art that microcomputer 60 provides a dial pulse output over line 187 by providing an input to driver 186, which causes the opening and closing of relay 182 in the known manner.

The telephone line to which the remote transcription unit is connected comprises tip line 13 and ring line 14. Tip line 13 is connected to one input of opto-isolator 206, which in the preferred embodiment is a conventional optically-coupled isolation circuit. The other input terminal of the opto-isolator is connected to the common terminal 192 of relay contacts 196. The output of opto-isolator 206 is provided on line 207 to ring detector 208, which is a conventional telephony ring detector circuit well known to those skilled in the art. The output of the ring detector is provided on line 209 to the T1 input test pin of microcomputer 60. Those skilled in the art will appreciate that microcomputer 60 may detect a ringing condition on the telephone line under program control by testing the T1 input for the output of ring detector 208.

In response to the detection of a ringing condition on the telephone line, or when the transcriptionist has depressed a sequence of keys corresponding to a command to call the machine control unit, microcomputer 60 seizes the telephone line by actuating seizure relay 190. Seizure relay 190 is a conventional telephone line seizure relay which is employed in the preferred embodiment in the conventional manner. The relay 190 comprises a pair of double pole single throw contacts 196, 197. Tip line 13 of the telephone line is provided to the common terminal 192 of one of the double pole single throw contacts through coupling capacitor 189; the ring line 14 is provided to the common terminal 193 of the other of the pair of relay contacts. Relay 190 is actuated by coil 191, one terminal of which is connected to a twelve volt power supply on line 194. The other terminal of coil 191 is provided on line 195 to the output of a conventional buffer driver 200. The diode 202 suppresses transients between the terminals of coil 191 in the known manner. The input of driver 200 is provided from one of the PORT1 outputs of microcomputer 60 on one of the lines 61. Thus, it will be appreciated that microcomputer 60 controls the actuation of relay 190 and the seizure of the telephone line by providing an output on one of the lines 61 to amplifier 200.

A lamp 203 provides a visual indicator to the transcriptionist of certain preselected functions. One terminal of lamp 203, a conventional twelve volt lamp, is provided to a twelve volt supply on line 204, while the other terminal is provided through a diode 205 to the output of a conventional driver 198. The input of driver 198 is provided from one of the PORT1 outputs of microcomputer 60 on one of the lines 61. Thus, microcomputer 60 controls the illumination of lamp 203 under program control. In the preferred embodiment, lamp 203 is continuously illuminated whenever the telephone line is seized, and is flashed on and off to provide a signal that a call is being received.

Seizure relay 190, when actuated, connects the common terminal 192 of relay contact 196 to line 187 and thus to dial pulse relay 182. Line 187 is AC-coupled to line 180 through capacitor 210 and resistor 211 in the known manner. As noted above, line 180 is provided to one terminal of the secondary wiring of transformer 173. Also, when the telephone line is seized, the common terminal 193 of relay contact 197 is connected to line 212 of the secondary coil of transformer 173. It will be appreciated by those skilled in the art that the actuation of relay 190 seizes the telephone line and couples signals through transformer 173 to the TEL terminal of antisidetone circuit 155. It will be further appreciated that signals received from the seized telephone line are provided to the OUT terminal of antisidetone circuit 155 on line 220 and that signals to be sent over the telephone line are provided to the IN terminal of antisidetone circuit 155.

Signals received from the telephone line once it has been seized by relay 190 are provided from antisidetone circuit 155 on line 220 to notch filter 221, which in the preferred embodiment comprises a conventional active band-pass filter circuit tuned to suppress the frequency of the guard tone. The output of notch filter 221 is provided on line 222 to automatic gain control circuit 223 and to notch filter 224. Notch filter 224 in the preferred embodiment comprises a conventional active band-pass filter circuit tuned to suppress the frequency of the guard tone. Automatic gain control circuit 223 comprises a conventional gain control circuit well known to those skilled in the art. The output of automatic gain control circuit 223 is provided on line 225 to dial tone detector 230, which in the preferred embodiment comprises a conventional dial tone detector circuit that provides an output when an input is received on line 225 having a frequency corresponding to the conventional telephony dial tone signal. The output of dial tone detector is provided on line 231, which is connected to one of the lines 61 and thus to PORT1 of microcomputer 60. Microcomputer 60, as will be appreciated by those skilled in the art, may thus detect the presence of a dial tone by testing the particular line of PORT1 which is connected to line 231 from dial tone detector 230.

Still referring to FIG. 2B, the output of notch filter 224 is provided on line 232 to low pass filter 233, which in the preferred embodiment comprises a conventional low pass active filter circuit tuned to pass audio signals. The output of low pass filter 233 is provided on line 234 to the input of analog switch 235. Analog switch 235 provides the signal received on line 234 to its output on line 236 when it receives a control signal on line 237. Line 237 is connected to the output of buffer driver 161, which in turn is driven by one of the lines 61 connected to PORT1 of microcomputer 60. It will be appreciated that microcomputer 60 thus controls the provision of audio signals received on line 234 to the output of analog switch 235.

The output of analog switch 235 is provided on line 236 to the input of buffer amplifier 240. Buffer amplifier in turn is provided on line 241 to the input of audio amplifier 242 through coupling capacitor 243. Audio amplifier 242 comprises in the preferred embodiment a conventional audio power amplifier which amplifies the audio signals provided on its input. The output of amplifier 242 is provided on line 23 and may be connected to headphones, a speaker, or the like, so that the transcriptionist may hear the recorded dictation. It will be appreciated that recorded dictation signals are received from the telephone line, are filtered through various filters, and are switched to audio amplifier 242 under the control of microcomputer 60.

Other audible signals are provided to audio amplifier 242 on line 244, which is connected to the output of analog switch 152. The input of analog switch 152 is connected to line 150 and thus to the output of low pass filter 145, seen in FIG. 2A, which filters the output of dual tone generator 140. Analog switch 152 is actuated by buffer driver 245 which provides a control signal on line 246 to analog switch 152. Driver 245 is controlled by microcomputer 60 through one of the lines 61 connected to PORT1. It will be appreciated that the output of dual tone generator 140 may be audibly perceived by the operator should microcomputer 60 actuate dual tone generator 140 together with analog switch 152. In the preferred embodiment, tones are generated by dual tone generator 140 to correspond to certain error or status signals which need to be communicated to the operator of the remote transcription unit. Microcomputer 60 provides the error or status signal tones to audio amplifier 242 by controlling driver 245 to cause analog switch 152 to superimpose the error or status signals upon the recorded dictation signals received on line 241.

III. THE MACHINE CONTROL UNIT

Figure 3A:
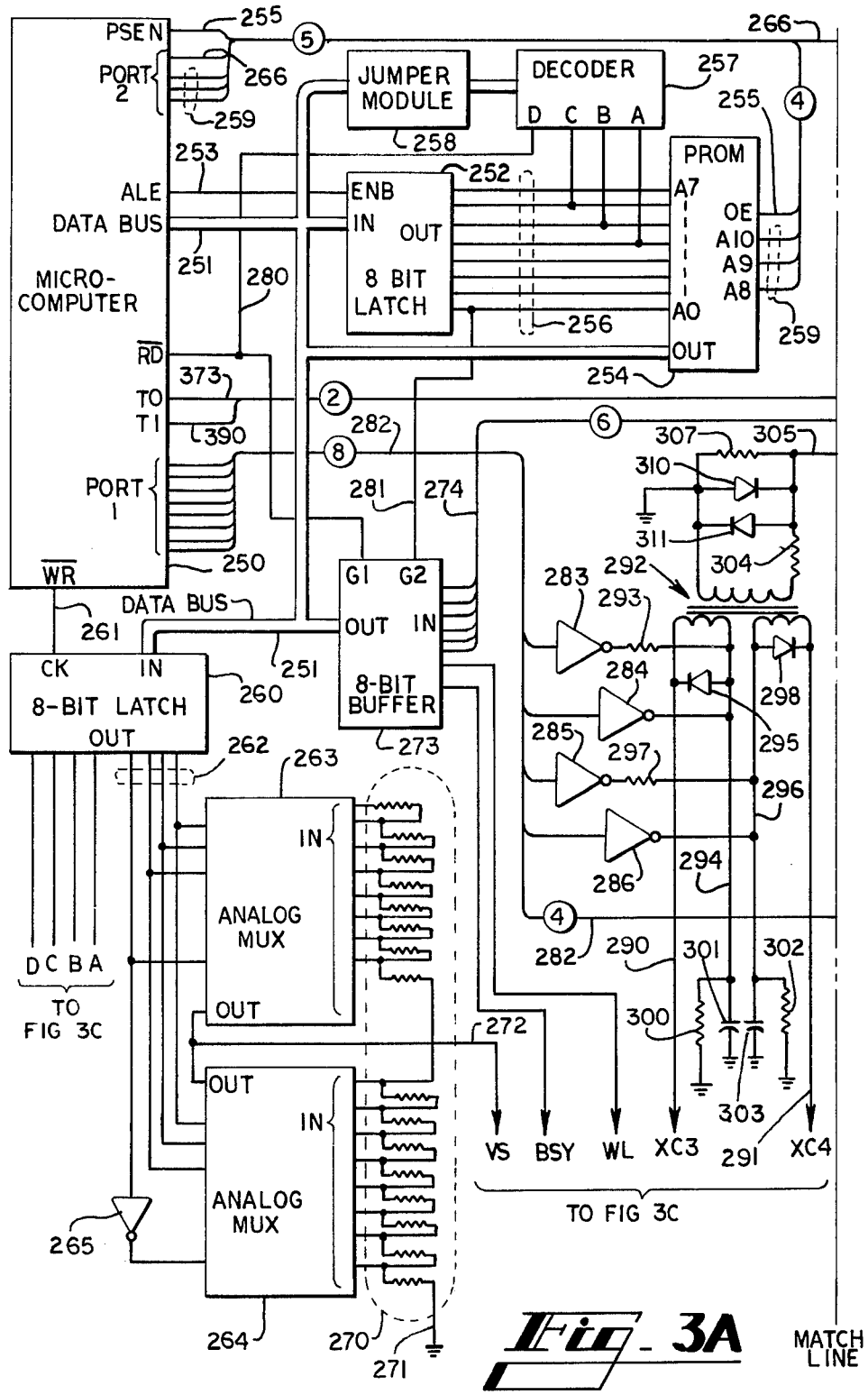

Turning now to FIGS. 3A, 3B and 3C, the preferred embodiment of the machine control unit 15 of the remote dictation transcription system of the present invention may be seen. The machine control unit in the preferred embodiment is capable of controlling a plurality of dictation recorders. Control signals are received over the telephone line from the remote transcription unit are used to control a selected one of the dictation recorders. Recorded dictation from the selected recorder is transmitted over the telephone line to the remote transcription unit.

In the preferred embodiment of the machine control unit, microcomputer 250, shown in FIG. 3A, performs the control functions necessary to coordinate the functions of answering a call on the telephone line from the remote transcription unit, seizing and holding the telephone line, transmitting and receiving control signals, selecting a dictation recorder, calling the remote transcription unit when monitoring of the recorders is desired, and switching the recorded dictation signals onto the telephone line. In the preferred embodiment, microcomputer 250 comprises a conventional microcomputer circuit such as the type 8039 microcomputer manufactured by Intel Corporation and used in the remote transcription unit.

An eight-bit data bus 251 connects microcomputer 250 with appropriate input and output circuitry. Data bus 251 is provided to eight-bit latch 252, which is a conventional latch such as the type SN74LS373 manufactured by Texas Instruments, Inc. The address latch enables ALE output of microcomputer 250 is provided on line 253 to the enable input ENB of latch 252. Those skilled in the art will appreciate that the ALE output of microcomputer 250 strobes the data on data bus 251 into latch 252.

The outputs OUT of latch 252 are provided on lines 256 to the address inputs A0–A7 of programmable read only memory (PROM) 254, which stores the program for microcomputer 250. In the preferred embodiment, PROM 254 comprises a two kilobyte by eight-bit word ultraviolet erasable programmable read only memory such as the type 2716 manufactured by Intel Corporation. Address lines A0–A7 of PROM 254 are provided from latch 252, and address lines A8–A10 are provided on lines 259 from PORT1 of microcomputer 250. It will be appreciated that an eleven-bit address word is provided to PROM 254 by microcomputer 250 through the combination of an eight-bit word provided on data bus 251 through latch 252, and by three bits of PORT2 of microcomputer 250 on lines 259 which provide the higher order bits for the address. The program store enable (PSEN) output of microcomputer 250 is provided on line 255 to the output enable (OE) input of PROM 254. In response to a signal provided over line 255, PROM 254 provides an eight-bit program instruction to data bus 251, where it can be read by microcomputer 250.

Three of the lines 256 from latch 252 are provided to the "A", "B", and "C" inputs of a decoder 257, which in the preferred embodiment comprises a conventional BCD-to-decimal decoder/driver such as the type SN7445 manufactured by Texas Instruments, Inc. The outputs of decoder 257 are jumpered via jumper module 258 to data bus 251. The read output RD of microcomputer 250 is provided on line 280 to the "D" input of decoder 257, thereby serving as a chip enable. Those skilled in the art will appreciate that by selectively jumping certain ones of the outputs of decoder 257 to data bus 251 through jumper module 258, a unique digital code may be caused to appear on the data bus in response to various three bit codes presented to the inputs of decoder 257 from latch 252. In the preferred embodiment, the unique digital code provides means for the machine control unit to verify that a security code received over the telephone line from a caller in fact identifies a transcriptionist who is authorized to access the machine control unit.

Data bus 251 is also provided to the inputs of eight-bit latch 260, which is used to select a dictation recorder and to select a speed for the dictation recorder selected. Latch 260 is a conventional eight-bit latch such as the type SN74LS377 manufactured by Texas Instruments, Inc. The write output WR of microcomputer 250 is provided on line 261 to the clock CK input of latch 260. It will be appreciated that an eight-bit data word placed on data bus 251 will be written into latch 260 when microcomputer 250 provides a signal on line 261. Four bits of an 8-bit data word provided to latch 260 are provided on output lines A, B, C, and D to select a dictation recorder, which is discussed in more detail in connection with FIG. 3C. The remaining four bits of the data word provided to latch 260 are provided on lines 262 to analog multiplexers 263 and 264. These four bits are used to select the speed of playback of a selected recorder. Logical inverter 265 insures that only analog multiplexer 263 or analog multiplexer 264 will be selected at any given time. In the preferred embodiment, analog multiplexers 263 and 264 comprise type CD4051 CMOS analog multiplexers manufactured by RCA Corporation.

A resistor ladder 270 is provided at the inputs of analog multiplexers 263 and 264 so that each input of the multiplexers is provided to a tap of resistor ladder 270 in the conventional manner. In the preferred embodiment, each resistor in resistor ladder 270 has the same resistance value. It will be understood that the four bits placed upon lines 262 from latch 260 select one input of either analog multiplexer 263 or 264 to appear on the output OUT on line 272. The top resistor of resistor ladder 270 is provided to the highest order input of analog multiplexer 263, while the bottom resistor of resistor ladder 270 is provided to a ground connection on line 271. The OUT outputs of analog multiplexers 263 and 264 are combined on lines 272 to provide a variable speed signal VS. It will be appreciated by those skilled in the art that the selection of one input of multiplexers 263 or 264 taps a particular point in resistor ladder 270 and thus causes a particular one of sixteen possible resistances to appear on line 272. In the preferred embodiment, therefore, line 272 provides a selectable variable resistance which is used to control the speed of a selected dictation recorder. The position of this variable resistance to a selected recorder is discussed in connection with FIG. 3C.

Data bus 251 is also provided to the OUT outputs of eight-bit buffer 273, shown in FIG. 3A. Buffer 273 in the preferred embodiment is a type 8ILS95 manufactured by National Semiconductor Corporation. The IN inputs of buffer 273 are provided from the BSY and WL lines of a selected recorder (FIG. 3C), and from lines 274. Lines 274 are connected to the outputs of dual tone decoder 275 and the output of dial tone detector 276. Enable input GI of buffer 273 is connected via line 280 to the read (RD) output of microcomputer 250. The other enable input G2 of buffer 273 is connected via line 281 to the least significant output bit of latch 252. It will be appreciated by those skilled in the art that logical "1" on line 281 to the enable input G2 of buffer 273 together with the RD output on line 280 causes the digital information appearing at the inputs of buffer 273 to be read onto data bus 251. Buffer 273 thus provides means for microcomputer 250 to sense which dual tones have been provided over the telephone line to dual tone decoder 275, to sense the busy status BSY and the work load status WL of a selected recorder, and to sense a dial tone appearing on the telephone line.

Various control functions for the dictation recorders and for the telephone line are provided on the output port PORT1 of microcomputer 250 over lines 282. It will be understood that the output port PORT1 of microcomputer 250 comprises eight lines which may be used to control output functions. Four of the eight lines of PORT1 are provided to conventional logical inverters 283, 284, 285 and 286. Inverters 283–286 preferably are open-collector inverters such as the type SN7406 manufactured by Texas Instruments, Inc. Inverters 283–286 couple digital control signals from microcomputer 250 onto lines 290 and 291. Lines 290 and 291 correspond respectively to the XC3 and XC4 lines, shown in FIG. 3C, which carry recorded dictation signals from a selected dictation recorder. In the preferred embodiment, a selected dictation recorder is controlled by superimposing encoded control signals having various voltage levels upon lines 290 and 291.

Isolation transformer 292 decouples the digital control signals provided by inverters 283–286 from the recorded dictation signals. Transformer 292 is a conventional isolation transformer having dual primary windings and a single secondary winding. A control signal from inverter 283 is coupled through resistor 293 to line 294. Lines 290 and 294 are connected to one of the primary windings of transformer 292. Diode 295 suppresses transients between lines 290 and 294 in the known manner. Inverter 284 also drives line 294. Inverter 285 is coupled to line 296 through resistor 297. Inverter 286 is also coupled to line 296. Lines 296 and 291 are provided to the other primary winding of transformer 292. Diode 298 suppresses transients between lines 296 and 291 in the known manner. Line 294 is filtered to ground through resistor 300 and capacitor 301. Line 296 is filtered to ground through resistor 302 and capacitor 303. It will be appreciated by those skilled in the art that various combinations of voltage levels may be coupled onto lines 290 and 291 by the provision of various combinations of control signals by microcomputer 250 to inverters 283–286.

The secondary winding of transformer 292 is provided through resistor 304 to line 305. Diodes 310, 311 suppress transients between line 305 and ground. Resistors 304 and 307 provide impedance matching for the input of automatic gain control (AGC) 306, shown in FIG. 3B. It will be appreciated that recorded dictation signals provided on lines 290 and 291 to transformer 292 are decoupled from any control signals from inverters 283–286 so that recorded dictation signals appear on line 305 without distortion.

Referring now to FIG. 3B, it may be seen that line 305 is provided to the input of automatic gain control (AGC) circuit 306, which comprises a conventional automatic gain control well known to those skilled in the art. The output of AGC 306 is provided on line 312 to the input of notch filter 313, which in the preferred embodiment is a conventional active band-pass filter which suppresses the guard tone frequency. The output of notch filter 313 is provided on line 314 to the input of analog switch 315, which comprises a conventional analog switch such as the type CD4016 manufactured by RCA Corporation. The output of analog switch 315 is provided through resistor 320 to a summing point on line 321. Buffer 322 provides a control signal on line 323 to analog switch 315. The input to buffer 322 is provided from one of the control lines 282 from PORT1 of microcomputer 250. It will be appreciated that the signal appearing on line 314 may be made to appear on line 321 under the control of microcomputer 250.

Oscillator 324 provides a signal of an audible frequency on line 325 to the input of analog switches 330 and 331. These audible signals may be transmitted over the telephone line by the machine control unit to the transcriptionist at the remote transcription unit. Buffer 332 provides a control signal on line 333 to analog switch 330, and buffer 334 provides a control signal on line 335 to analog switch 331. Buffers 332 and 334 receive control signals from one of the control lines 282 from PORT1 of microcomputer 250. The output of analog switch 330 is provided through resistor 340 to line 321, while the output of analog switch 331 is provided through resistor 341 to summing point 321. In the preferred embodiment, resistor 340 is of a magnitude sufficiently lower than resistor 341 so that a high level audible signal may be made to appear by selecting analog switch 330, while a low level audible signal is made to appear on line 321 by selecting analog switch 331. In the preferred embodiment, the magnitudes of resistors 340 and 341 were chosen so that the operator of the remote transcription unit can audibly perceive distinctly different high level and low level tones.

Summing point 321 is provided to the input of antisidetone circuit 342. It will be appreciated by those skilled in the art that microcomputer 250 can selectively place recorded dictation signals at the input of antisidetone circuit 342, or a high level signal or a low level signal. As in the case for the remote transcription unit, antisidetone circuit 342 is a conventional telephony antisidetone circuit which provides the signal received on the IN input on line 321 to a telephone-compatible terminal TEL output on line 343, and provides signals received line 174 at the OUT output on line 344.

The TEL terminal of antisidetone circuit 342 is provided on line 343 and is coupled through resistor 345 to one terminal of the primary winding of transformer 350, a conventional telephony transformer. The other terminal of the primary winding of transformer 350 is provided on line 351 to a six volt power source.

One terminal of the secondary winding of transformer 350 is provided on line 352 to a contact 346 of relay 347. The other contact of relay 347 is provided on line 348. Relay 347 is used to provide standard dial pulses compatible with conventional telephony equipment. Relay 347 is actuated by coil 348. One terminal of coil 348 is connected to a twelve volt power source on line 349, and the other terminal is connected by line 357 to the output of conventional buffer driver 358. Diode 359 suppressed transients between lines 349 and 357 in the known manner. Microcomputer 250 controls the provision of dial pulses by actuating relay 347 with a control signal on the input of driver 358 from one of the PORT2 outputs on line 266.

Telephone line seizure relay 356 seizes the telephone line upon command from microcomputer 250. Relay 356 is preferably a conventional telephony line seizure relay having a pair of double pole single throw contacts 343, 354. Line 348 from relay 347 is provided to the normally open contact of relay contact 353. Line 352 is AC-coupled to line 348 through capacitor 367 and resistor 368. A terminal of the secondary winding of transformer 350 is provided on line 355 to the normally open terminal of relay contact 354. The normally closed terminal of relay contact 353 is provided through resistor 360 and capacitor 361 to the normally closed terminal of relay contact 354. Both double pole single throw relay contacts 353, 354 are actuated by coil 362, which is driven by buffer 363. Diode 364 suppresses transients between the terminals of coil 362 in the known manner. Buffer driver 363 is driven by one of the control lines 282 from PORT1 of microcomputer 250. It will be appreciated that microcomputer 250 controls the actuation of relay 356 by providing a control signal to buffer driver 353.

The common terminal of relay contact 353 is provided on line 365 through AC-coupling capacitor 366 to the tip line 13' of a standard telephone line. The common terminal of relay contact 354 is provided to the ring line 14' of a the telephone line. Line 365 and tip line 13' are provided to the inputs of optoisolator 370. In the preferred embodiment, optoisolator 370 comprises a conventional optically-coupled isolation circuit which is capable of detecting the presence of a ring signal on a standard telephone line and providing an output in response thereto. The output of optoisolator 370 is provided on line 371 to the input of ring detector circuit 372. A ring signal appearing on the telephone lines 13' and 14' will ring detector 372 to place a signal on line 373. Line 373 is provided to the T0 input of microcomputer 250. It will be appreciated by those skilled in the art that the T0 input of microcomputer 250 is a program testable input which can be periodically sampled under program control to determine whether a ring signal is appearing on the telephone line. In the preferred embodiment, microcomputer 250 responds to the detection of a ring signal on line 373 by providing a control signal through one of the control lines 282 from PORT1 to buffer driver 363, which seizes the telephone line by tripping relay 356 through coil 362. Once relay 356 is tripped, signals may be sent and received over the telephone lines. Signals received over the telephone line are provided at the output OUT of antisidetone circuit 342 on line 344. Line 344 is provided to the input of low pass filter 374 and the input of buffer amplifier 375. The output of buffer amplifier 375 is provided on line 376 to the input of dual tone decoder 275. In the preferred embodiment, dual tone decoder 275 provides a digitally-encoded signal corresponding to a dual tone pair received on the telephone line. The digitally-encoded signal is coupled through diodes 380a–380e to lines 274, which are provided to the inputs of buffer 273 (FIG. 3A). Resistors 381a–381e provide a pull-up function to diodes 380a–380e in the known manner. It will be appreciated by those skilled in the art that dual tone pairs received over the telephone line from the remote transcription unit may be detected and interpreted by microcomputer 250 through dual tone decoder 275, and that the microcomputer may then implement a function corresponding to the particular dual tone pair received.

Signals received from antisidetone circuit 342 are also provided on line 344 to the input of low pass filter 374. In the preferred embodiment, filter 374 is a conventional active low pass filter which attenuates signals having a frequency slightly above the frequency of the guard tone provided by the guard tone generator in the remote transcription unit. The output of low pass filter 374 is provided on line 382 to the input of high pass filter 383, and the input of dial tone detector 276. Dial tone detector 276 is a conventional telephony dial tone detector which provides an output upon the detection of a dial tone. This output is provided on one of the lines 274 to the inputs to buffer 273 (FIG. 3A), so that microcomputer 250 may periodically test the telephone line for the presence of a dial tone.

High pass filter 383 is a conventional active high pass filter which passes signals having a frequency slightly below the frequency of the guard tone generated by guard tone generator. The output of high pass filter 383 is provided on line 384 to the input of notch filter 385, which in the preferred embodiment is a conventional active band-pass filter having a narrow bandwidth which passes the frequency of the guard tone generated by the guard tone generator. It will be appreciated by those skilled in the art that low pass filter 374, high pass filter 383, and notch filter 385 perform multiple stage filtering to insure that the presence or absence of the guard tone may be easily detected.

The output of notch filter 385 is provided on line 386 to limiter 387, which in the preferred embodiment is a conventional limiter circuit that provides a constant level output signal. The output of limiter 387 is provided on line 388 to the input of phase lock loop 389. Phase lock loop 389 is a conventional phase lock loop circuit such as the type NE587 phase lock loop manufactured by Signetics Corporation. Phase lock loop 389 is tuned to the frequency of the guard tone so that an output is provided only in the presence of the guard tone on line 388. The output of phase lock loop 389 is provided on line 390 to the T1 input of microcomputer 250, program testable input which can be periodically sampled under program control. It will thus be appreciated that the presence of the guard tone may be ascertained by microcomputer 250 simply by reading the input on line 390. It may be seen that low pass filter 374, high pass filter 383, notch filter 385, limiter 387, phase lock loop 389, and microcomputer 250 comprise means for detecting the presence or absence of a guard tone provided by remote transcription unit 12, and further that microcomputer 250 provides means for initiating or discontinuing control functions of a selected dictation recorder in response to the detection of the presence or absence of the guard tone.

FIG. 3C is a schematic diagram of the dictation recorder control circuits of the machine control unit 15. These circuits provide for the selection of a dictation recorder and for the multiplexing of various signals to and from a selected dictation recorder. The preferred embodiment of the present invention is capable of controlling as many as eight dictation recorders. The dictation recorders suitable for use with the present invention comprise dictation recorders having a variable speed input VS, a workload status output WL, a busy status output BSY, a ground terminal, and multi-purpose terminals C3 and C4 upon which control signals are coupled and upon which recorded dictation signals are received. It will be appreciated by those skilled in the art that the recorder control circuit disclosed herein may be adapted for use with other types of dictation recorders having different configurations of status, audio, and control signal inputs and outputs. The discussion which follows in connection with FIG. 3C pertains to a dictation recorder having inputs and outputs as described above.

In the preferred embodiment, a dictation recorder is selected by microcomputer 250, shown FIG. 3A, by placing an eight-bit digital word into latch 260. The eight-bit word in latch 260 both selects a particular dictation recorder and selects a speed of playback of the recorder selected. Lines A, B, C, and D, which originate on FIG. 3A, are used in FIG. 3C to select a particular one of the dictation recorders to which the machine control unit 15 is connected. Analog multiplexer 400 is used to selectively route the variable speed signal VS on line 272 to the selected dictation recorder. In the preferred embodiment, multiplexer 400 comprises an analog multiplexer such as the type CD4051 manufactured by RCA Corporation. Line D is provided to the inhibit (INH) input of analog multiplexer 400 so that the outputs OUT of multiplexer 400 are in the "off" state when a logical one appears on line D. Those skilled in the art will appreciate that the variable speed signal VS appearing on line 272 may be made to appear at a selected one of the outputs OUT of multiplexer 400. Lines VS1, VS2, . . . VS8 are provided to a recorder control circuit such as the one indicated at 401a, associated with the dictation recorder 40a. Recorder control circuits 40a is a typical recorder control circuit, and it will be understood that similarly constructed recorder control circuits 401b-401h are provided for each dictation recorder 401b-401h controlled by the machine control unit.

In the event that dictation recorder 40a is selected, multiplexer 400 selects line VS1 to receive the variable speed signal VS from line 272. The variable speed signal on line VS1, after filtering to ground in a conventional manner by capacitor 402, is provided to the VS input of recorder 40a on line 52. It will be appreciated that the selection of recorder 40a and the provision of the variable speed signal VS to recorder 40a provides means for selectively controlling the speed of playback of recorder 40a.

Digital multiplexer 403 selects the workload status signal WL received from a selected dictation recorder and provides it on line WL to buffer 273, shown in FIG. 3A. In FIG. 3C, line WL is provided from the output OUT of multiplexer 403. The inputs of multiplexer 403 are provided on lines WL1, WL2, . . . WL8 from the various recorder control circuits 401a, 401b,-401h. A particular one of the workload status signals is selected to be provided on the output OUT of multiplexer 403 by lines A, B, and C. In the preferred embodiment, multiplexer 403 is a conventional high voltage 8-channel data selector such as the type CD4512 manufactured by RCA Corporation. It will be appreciated by those skilled in the art that a particular one of the inputs to multiplexer 403 is provided at the output OUT by selection on lines A, B, and C. The workload status signal of a typical dictation recorder 40a is provided on line 50 through resistors 404 to line WL1. Resistor 405 shunts the signal to ground. Diode 406 clamps the signal to line 407, which is connected via daisy-chain through other recorders to a conventional current limiting circuit 408. It will be appreciated that the workload status signal from each dictation recorder is provided through a similar circuit to lines WL2-WL8 and thence to the respective inputs of digital multiplexer 403.

Decoder 410 selects and seizes a particular dictation recorder which corresponds to the inputs received on lines A, B, C, and D. In the preferred embodiment, decoder 410 comprises a BCD-to-decimal decoder such as the type 7442 manufactured by Texas Instruments, Inc. Those skilled in the art will appreciate that a particular one of the outputs OUT of decoder 410 may be selected when a code representative of the dictation recorder desired to be selected is received on lines A, B, C, and D. A low level logical "one" appears on the selected one of the outputs OUT of decoder 410. The outputs of decoder 410 are provided on lines SEL1, SEL2,-SEL8 to the corresponding recorder control circuits 401a, 401b,-401h, respectively. For example, a low level logical "one" appearing on line SEL1 provides an indication that recorder 40a is desired to be selected.

Line SEL1 is connected to the base of an NPN transistor 412 through resistor 413. A low on line SEL1 removes the bias at the base of transistor 412 in recorder control circuit 401a. Those skilled in the art will appreciate that removal of the bias at the base of transistor 412 will cause the transistor to turn "off". The emitter 414 of transistor 412 is connected to ground. The collector 415 of transistor 412 is connected to the bases of transistors 420, 421 through biasing resistors 422, 423. Resistor 424 connects resistors 422, 423 to a power source on line 427.

In the non-selected modes with transistor 412 conducting, the bases of transistors 420 and 421 are biased in the "off" mode since a virtual ground appears at the collector 415 of transistor 412. A diode 425 conducts current from the emitter of transistor 421 to line 290 when transistor 421 is in the "on" mode. Similarly, a diode 426 conducts current from the emitter of transistor 420 to line 291 when transistor 421 is "on". In the "off" mode of transistors 420, 421, recorded dictation signals appearing on lines 44 and 45 of recorder 40a are prevented from appearing on lines XC3 and XC4 because diodes 425, 426 block the current path.

If recorder 40a has been selected by a low appearing on line SEL1, transistors 420 and 421 are in the "on" mode and conduct current from lines 45 and 44 to lines 290 and 291, respectively. Control signals imposed on lines XC3 (290) and XC4 (291) by inverters 283–286 (FIG. 3A) thus are passed to the selected recorder. In response to appropriate control signals known to those skilled in the art, recorded dictation signals will thereafter appear on lines 44 and 45, and are then allowed to appear on lines XC3 and XC4. Similar circuitry in recorder control circuits 401b–401h does not interfere with the recorder dictation signals and control signals for the selected recorder because transistors corresponding to those indicated at 420 and 421 for nonselected recorders are biased in the "off" mode. Diodes in non-selected recorder circuits, such as those indicated at 425 and 426 in recorder control circuit 401a, prevent current from flowing into transistors corresonding to 420 and 421 in such non-selected recorder control circuits due to back-biasing in the known manner.

Still referring to FIG. 3C, digital multiplexer 430 receives the busy status signals BSY1, BSY2,–BSY8 from recorder control circuit 401a, 401b,–401h, respectively, and multiplexes the busy status signal of a selected recorder output OUT on the line BSY. In the preferred embodiment, multiplexer 430 is a conventional high voltage 8-channel data selector such as the type CD4512 manufactured by RCA Corporation. A three bit code on lines A, B and C selcts one of the eight busy status signals. The output of multiplexer 430 is provided on line BSY to an input of buffer 273, shown in FIG. 3A. It will be appreciated that only the busy status signal from the selected recorder is allowed to appear on line BSY to buffer 273, so as to be read by microcomputer 250.

A busy status signal of a typical recorder 40a is provided on line 51 to recorder control circuit 401a. The busy status signal, 24 volts in the recorders with which the disclosed embodiment is operative, is provided to line BSY1 at a reduced voltage level by resistors 431, 432, which are configured as a conventional voltage divider.

Power for the recorder control circuits is drawn from the recorders in the following manner. Lines 50, 51, which carry the WL and BSY signals, are clamped to line 407 through diodes 406, 433. Line 407 is provided to the emitter of a PNP transistor 416. The collector of transistor 416 is connected to line 427, which provides current to bias the bases of transistors 420, 421. The base of transistor 416 is biased through a resistor 417 and an NPN transistor 418. Transistor 418 is biased on by a five volt supply. Those skilled in the art will appreciate that transistor 416 conducts and powers the recorder control circuits 401a, 401b,–401h so long as transistor 418 is biased on. It will be further appreciated that the loss of the five volt supply results in the simultaneous power-down of all recorder control circuits.

IV. THE GUARD TONE GENERATOR

Turning now to FIG. 4, a schematic diagram of the preferred embodiment of the guard tone generator 170 of the remote transcription unit 12 shown in FIGS. 2A and 2B may be seen. It may be recalled from the discussion pertaining to FIGS. 2A and 2B that microcomputer 60 provides a two megahertz digital signal on line 143 to divide-by-two circuit 144, which provides a one megahertz signal on line 146. The one megahertz digital signal on line 146 is provided to the clock input CK of guard tone generator 170. The CK input of guard tone generator 170 is provided to the clock input of a conventional delay flip-flop 440 well known to those skilled in the art. The inverted output of flip-flop 440 is fed back on line 441 to the D input of the flip-flop and is also provided to the clock input CK of counter 442. Counter 442 is a conventional four-bit binary counter such as the type SN74LS161 manufactured by Texas Instruments, Inc. The enable inputs, PE and TE, and preset inputs A and B of counter 442 are tied to a five volt power source on line 443. The C and D preset inputs of counter 442 are tied to a ground on line 444. The carry output CO of counter 442 is provided on line 445 to the input of a conventional inverter 446, whose output is provided on line 447 to the load input LD of counter 442. The most significant output bit, QD, of counter 442 is provided on line 450. It will be appreciated by those skilled in the art that counter 442 is configured as a conventional divide-by-thirteen counter, and that the one megahertz signal appearing on line 145 is divided by flip-flop 440 and counter 442 into a 38,461 hertz signal which appears on line 450.

The 38,461 hertz signal on line 450 is provided to the clock input CK of a conventional four bit binary counter 451. Counter 451 in the preferred embodiment comprises a CMOS type 4520 counter manufactured by RCA Corporation. Line 173, from PORT1 of microcomputer 60 (FIG. 2A), is provided to the ON input of guard tone generator 170 and thence to the reset input R of counter 451. It will be appreciated by those skilled in the art that a "one" on line 173 prevents counter 451 from counting. If a "zero" appears on line 173, counter 451 counts at the frequency provided on line 450.

The outputs of counter 451 are provided to analog multiplexer 452. Multiplexer 452 in the preferred embodiment is a conventional eight channel analog multiplexer such as the type CD4051 manufactured by RCA Corporation. The least significant bits of counter 451 are provided on lines 453 to the select inputs A, B and C of multiplexer 452. The most significant output bit, Q3, of counter 451 is provided to the channel inputs I0–I7 of multiplexer 452 on line 456. Line 456 is provided through resistor 457 to the I0 and I7 inputs of multiplexer 452. Line 456 is provided through resistor 458 to the I1 and I6 inputs of multiplexer 452. Line 456 provided through resistor 459 to the I2 and I5 inputs of multiplexer 452, and line 456 is provided through resistor 460 to the I3 and I4 inputs of multiplexer 452. Resistors 457, 458, 459 and 460 have progressively smaller magnitudes, with resistor 457 having the largest magnitude and resistor 460 having the smallest magnitude. The output of multiplexer 452 is provided on line 461. It will be appreciated by those skilled in the art that multiplexer 452, configured as shown in FIG. 4, comprises a stepped approximation sine wave generator which produces an approximated sine wave at 2403 hertz on line 461.

Resistors 462 and 463, which are configured as a conventional voltage divider, establish a reference voltage level for the approximated sine wave appearing on line 461. Resistor 462 is tied to a five volt power source; while resistor 463 is tied to ground. The signal appearing on line 461 is provided through resistor 464 to line 470. Capacitor 465 is tied from line 470 to ground. Resistor 464 allows current from line 461 to charge capacitor 465 so that a signal more closely approximating a sine wave appears on line 470. Capacitor 471 passes the AC component of the approximated sine wave on line 470 to line 472. Line 472 is biased to six volts through resistor 473. The sinusoidal signal appearing on line 472 is provided to the input of low pass filter 474, which in the preferred embodiment is a conventional active low pass filter tuned to filter undesirable high-frequency harmonies from the guard tone. The output of low pass filter 474 is provided on line 171. It will be appreciated by those skilled in the art that guard tone generator 170 provides means for generating a guard tone signal on line 171 under the command of microcomputer 60, and that this guard tone signal may be initiated and terminated under program control by microcomputer 60.

V. OPERATION OF THE REMOTE TRANSCRIPTION UNIT

Those skilled in the art will now understand and appreciate that a system for the remote transcription of recorded dictation may be constructed by a circuit comprising digital and analog hardware, or by a preferred embodiment, as disclosed herein, using a programmed microcomputer together with peripheral digital and analog hardware. It will be understood that the embodiment disclosed herein is merely illustrative and that the functional equivalents of microcomputer 60 and 250 may include other digital devices, including digital hardware, firmware, or software, which are capable of performing the described functions in a remote transcription system.

Figure 5B:
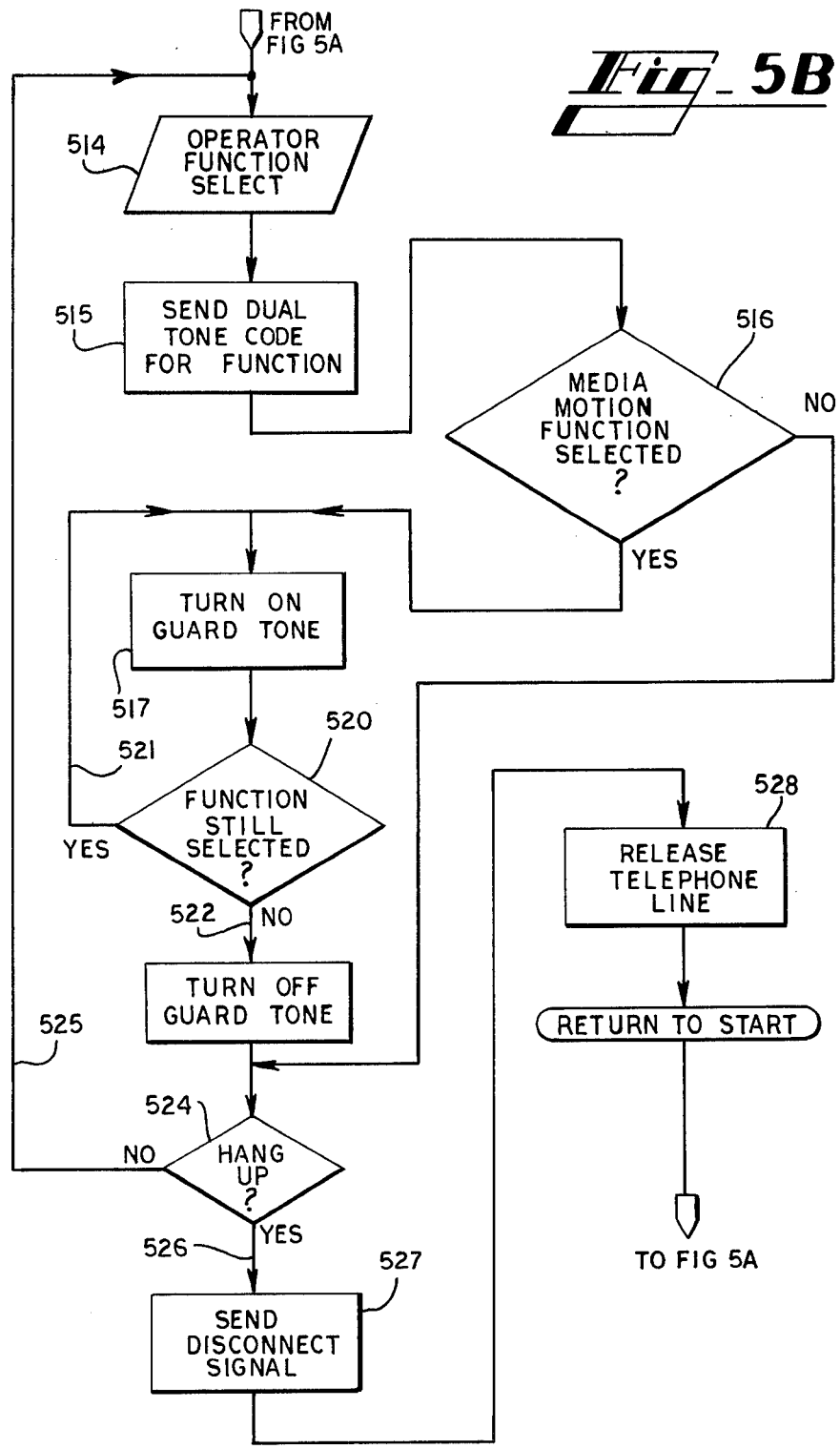

The sequences of operations by which microcomputer 60 and 250 perform the functions of the present invention are described in FIGS. 5A, 5B and 6. FIGS. 5A and 5B are flow diagrams for the preferred embodiment of the remote transcription unit shown at 12 in FIG. 1. It will be appreciated by those skilled in the art that microcomputer 60 of remote transcription unit 12 may be programmed to perform the steps outlined in FIGS. 5A and 5B.

Starting at START block 480 in FIG. 5A, microcomputer 60 waits for the transcriptionist/operator to depress a sequence of keys on key pad 20 in order to initiate the transcription operation. In the preferred embodiment, the operator enters a two digit code on key pad 20 that provides an indication to microcomputer 60 that the operator desires to transcribe recorded dictation. Microcomputer 60 responds to the two digit code in block 482 by seizing the telephone line. It may be recalled that the telephone line is seized when microcomputer 60 outputs on one of the PORT1 outputs a signal on one of the lines 61 which actuates relay 190 (FIG. 2B).

After the telephone line is seized at 482, microcomputer 60 determines whether a dial tone is present on the telephone line at block 483. Microcomputer 60 determines whether a dial tone is present by reading line 231, the output of dial tone detector 230 (FIG. 2B). When the dial tone is detected by microcomputer 60, the telephone number corresponding to the machine control unit 15 is retrieved from random access memory 90 (FIG. 2A), and converted into dual tone signals by dual tone generator 140. These dual tones are output through analog switch 151 and thus onto the telephone line. Alternatively, microcomputer 60 may provide dial pulses to the telephone line by actuating relay 182 (FIG. 2B). The block corresponding to the dialing of the telephone number corresponding to the machine control unit is shown at 484 in FIG. 5A.

After dialing the number of the machine control unit, microcomputer 60 awaits an acknowledge tone from machine control unit 15. In the preferred embodiment, the acknowledge tone generated by the machine control unit is produced by oscillator 324 (FIG. 3B) and has the same frequency as the dial tone, so that microcomputer 60 can determine whether the acknowledge tone has been received by reading line 231, the output of dial tone detector 230 (FIG. 2B). Those skilled in the art will appreciate that various sequences and timings of signals from the machine control unit may be used to insure that machine control unit 15 has acknowledged being called. In the event that a proper sequence of acknowledge tones is not received at decision block 485 in FIG. 6, microcomputer 60 may begin a timing subroutine as shown in block 486. In the event that a predetermined amount of time has not expired for receipt of the acknowledge tones, the NO branch 487 from decision block 486 may be followed.

Microcomputer 60 again tests for the acknowledge tone at block 485 if the time within which the acknowledge tones are to be received has not expired. In the event that the time has expired for receiving the acknowledge tones, the YES branch 490 is followed, leading to block 491. At block 491, microcomputer 60 may generate tones which correspond to an error condition with dual tone generator 140 (FIG. 2A), which may be switched to the head set of the transcriptionist through analog switch 152. An error tone generated at this point in the flow diagram of FIG. 6 provides an indication that although the telephone number of the machine control unit has been dialed, for some reason no acknowledgement has been received from the machine control unit, so that an error condition exists which requires operator attention. For example, if the telephone line of the machine control unit is busy, no acknowledge tones will be received, and the transcriptionist, upon hearing error tones at this point, will understand that a connection has not been made and will understand that an attempt to re-dial may be appropriate.

Still referring to FIG. 5A, if the acknowledge tones are received from the machine control unit within the requisite time, the YES branch 492 of decision block 485 is followed. Microcomputer 60 then outputs an identification (ID) code with a sequence of dual tone pairs through dual tone generator 140. This ID code corresponds to the identification of the remote transcription unit which has dialed the machine control unit. This step is indicated at block 493.

Microcomputer 60 may again await the receipt of acknowledge tones from machine control unit 15 which confirms that the identification code has been received and that it is permissible for the operator to receive dictation for transcription. Again, microcomputer 60 tests for the acknowledge tones by testing line 231 of dial tone detector 230 (FIG. 2B), at block 494. In the event that the acknowledge tones have not been received by microcomputer 60, the NO branch 495 of decision block 494 is followed. Microcomputer 60 may again implement a timing function so as to allow for the receipt of the acknowledge tones within a predetermined time period.

At decision block 500, if the predetermined time allowed for receipt of the acknowledge tones has not expired, the NO branch 501 is followed from block 500, which returns microcomputer 60 to decision block 494, awaiting receipt of the acknowledge tones. In the event that the predetermined time has expired for receipt of the acknowledge tone, the YES branch 502 of decision block 500 is followed, which leads to block 503. At block 503, microcomputer 60 may generate error tones to the operator of the remote transcription unit to provide an indication that no acknowledge tones have been received. After the error tones have been generated, microcomputer 60 returns to the start block 480. In this situation, a unique sequence of tones may be generated which provides an indication to the operator that access has not been authorized to the particular machine control unit dialed.

If the acknowledge tone was received at decision block 494 within the predetermined time, the YES decision branch 510 is followed to block 512. At block 512, microcomputer 60 switches on analog switch 235 (FIG. 2B), which allows recorded dictation signals received over the telephone line to be amplified by amplifier 242 and thus heard by the operator through the headset.

At block 513, the operator may select a particular dictation recorder by inputting predetermined code of digits on key pad 20. The remote transcription unit then transmits to the machine control unit a sequence of dual tones which correspond to a command to the machine control unit to seize a particular dictation recorder. Alternatively, at block 513, a recorder may be automatically selected by the machine control unit, as will be described in FIGS. 6A and 6B.

At block 514 in FIG. 5B, the operator may desire for one of a number of various functions to be performed. It will now be understood that various commands corresponding to various functions may be selected by the operator and transmitted to the machine control unit by actuating keys of the key pad or switches of the foot pad. In the preferred embodiment, a unique sequence of depressions of keys of the key pad corresponds to a command to implement desired functions.

For example, the amount of recall is set by depressing a predetermined series of digits. After the predetermined series, a preselected number may be entered which corresponds to the amount of recall desired. For example, the "1" digit may correspond to a short recall, the "2" digit a longer recall, and the "5" digit a still longer recall. Another digit, for example "0", corresponds to no recall. Microcomputer 60 of the remote transcription unit is programmed to respond to these particular digits by outputting a predetermined sequence of dual tones to the machine control unit. Microcomputer 250 of the machine control unit interprets the sequence and stores a digital word corresponding to the desired amount of recall in an internal register. The appropriate amount of recall is then automatically provided by rewinding the selected dictation recorder a predetermined amount each time the listen switch is depressed and released. The amount of recall may be changed at any time that block 514 is reached in the flow of operation.

In a similar fashion, the speed of playback of a selected recorder is controlled. The speed control is initially be set to a "normal" speed with a particular code on lines 262 (FIG. 3A) to multiplexers 263, 264 from microcomputer 250 through latch 260. A "normal" speed signal will then appear on line 272 to the selected recorder. A predetermined sequence of digits on the key pad at 514 corresponds to a command to change the speed of playback. Then, the operator may depress a particular digit to increase or decrease the speed. Or, a one digit on the keypad sets the speed control slower one notch each time the digit is pressed, another digit sets the speed control faster for each depression of the key, and yet another digit sets the speed control back to the center of the range. A predetermined sequence of dual tones is transmitted by the remote transcription unit at 515 which corresponds to the particular command selected. The commands are decoded by microcomputer 250 and a digital word corresponding to the desired speed of playback is stored in an internal memory register.

A monitoring feature is also selectable at block 514 in the preferred embodiment disclosed herein. A predetermined sequence of digits entered by the operator causes a sequence of dual tones to be generated at 515 which initiates the monitoring feature. The sequence of digits includes the telephone number of the remote transcription unit, which is stored upon receipt in a memory register of microcomputer 250 (FIG. 3A). The feature may also be programmed to initiate automatically under certain conditions. This monitoring feature is useful for informing the transcriptionist when dictation has become available for transcription when there is presently no dictation to be transcribed.

The monitoring feature may be described as follows. When all recorders provide status indications that there is no work load (WL) and they are not busy (BSY), the machine control unit may then initiate the monitoring feature. The feature may be selected with a predetermined sequence of dial tones at 515, or alternatively the machine control unit may be programmed to respond to this status situation by automatically selecting the monitor feature and providing a unique sequence of high- and low-level tones to the operator which is recognizable as corresponding to the selection of the monitor feature. The telephone lines of both the remote transcription unit and the machine control unit are then released and the transcriptionist is free to perform other tasks until recorded dictation is available.

The machine control unit then begins to monitor the WL and BSY status signals of each recorder, rather than wait for a call from the transcriptionist. When a machine provides an indication that it is not busy and has a workload available, the machine control unit automatically dials the telephone number of the remote transcription unit, which was stored in a memory register. The remote transcription unit responds by causing lamp 203 (FIG. 2B) to flash. This provides a visual indication to the operator that dictation is ready to be transcribed. The actuation of a predetermined sequence of keys seizes the telephone line and transcription begins, if the transcriptionist sees the visual indicator within a predetermined time. If the transcriptionist does not respond within the predetermined time, the machine control unit abandons the line and attempts to re-dial the remote transcription unit after a short wait.

Once the system is ready to send and receive signals and begin transcription, after features such as recall, variable speed, and monitor have been set, microcomputer 60 awaits the depression by the operator of listen switch 32, fast forward switch 33, or rewind switch 34 (FIGS. 1,2A). These commands correspond to a recording media motion function. The depression of these operator function switches is detected by microcomputer 60 at block 514 of FIG. 5B. In response to the depression of a particular function switch by the operator, microcomputer 60 transmits a dual tone which corresponds to the particular function desired. The performance by microcomputer 60 of this step is shown at block 515.

The selection by the operator of the listen switch, the fast forward switch, or the rewind switch, each of which corresponds to a media motion function, is accompanied by the guard tone. At 516, a test is made to determine if a media motion function has been selected. If so, microcomputer 60 at 517 causes the generation of the guard tone by guard tone generator 170 (FIGS. 2B, 4). In the preferred embodiment, the guard tone is provided at all times that a recorder media motion function has been selected by the operator. At decision block 520, microcomputer 60 determines whether the selected function switch is still being depressed by the operator. If the function switch is still being depressed by the operator, the YES branch 521 of decision block 520 is followed, which returns to 517 and causes microcomputer 60 to continue to provide the guard tone. In the event that the function switch has been released by the operator, the NO branch 522 is followed from decision block 520, and the guard tone is turned off at 523.

At the cessation of any particular function, microcomputer 60 in the preferred embodiment tests to determine whether the operator has completed transcribing dictation. At decision block 524, microcomputer 60 is receptive to a sequence of keys of key pad 20 which indicates that the operator has completed transcription and desires to release the telephone line. In the event that the operator has not depressed the appropriate sequence of keys, the NO branch 525 of decision block 524 is followed, which returns to the operator function select block 514. A new function can then be selected by the operator. In the event that the appropriate sequence of keys has been depressed, the YES branch 526 of decision block 524 is followed to 527, where microcomputer 60 sends a "disconnect" signal to the machine control unit by a predetermined sequence of dual tone pairs or the like. Then, microcomputer 60 releases the telephone line at 528 by deactuating relay 190, and microcomputer 60 returns to start block 480 to await a new sequence of instructions. It will be appreciated that other commands and functions may be selected and performed by the disclosed embodiment of the present invention, that other sequences of operation may be employed, and that the features and functions disclosed above are illustrative and are not limitative thereof.

VI. OPERATION OF THE MACHINE CONTROL UNIT

Figure 6B:
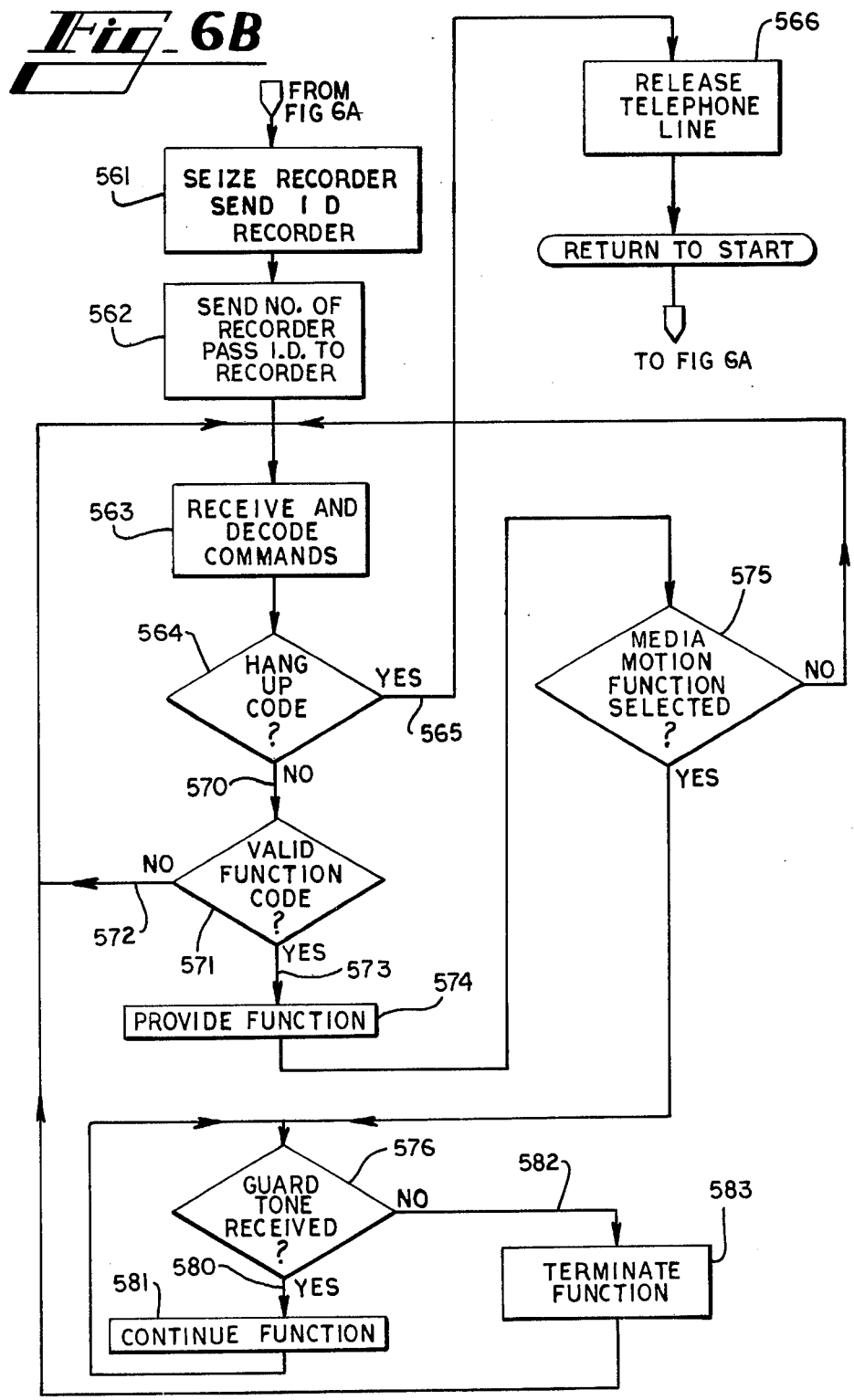

Turning now to FIGS. 6A and 6B, flow diagrams for the preferred embodiment of the machine control unit of the present invention are described. Starting at START block 540, microcomputer 250 of machine control unit 15 awaits the receipt of a ring signal from the telephone line. At decision block 541, microcomputer 250 tests the TO input on line 373 (FIGS. 3A, 3B) which is the output of ring detector 372. In the event a ring has been detected at 541, the YES branch 542 is followed to block 543, where microcomputer 250 seizes the telephone line by actuating relay 356 (FIG. 3B). Microcomputer 250 then transmits a high level acknowledgement tone by turning on analog switch 330. Preferably, a sequence of acknowledgement tones having predetermined durations is sent by microcomputer 250. The remote transcription unit responds to the sequence of tones having predetermined durations as receipt of the acknowledgement tone discussed in connection with FIGS. 5A and 5B.

In the preferred embodiment, the remote transcription unit, after receipt of acknowledge tones, transmits a sequence of dual tones which correspond to an identification (ID) number or code of the remote transcription unit which has called the machine control unit. At block 545 in FIG. 6A, microcomputer 250 of the machine control unit reads the sequence of dual tones or dual tone decoder 275 (FIG. 3B), and determines whether a valid identification code has been received.

In the preferred embodiment, microcomputer 250 senses the dual tone signals by reading on data bus 251 the contents of buffer 273, which transfers the output of dual tone decoder 275 upon command by the microcomputer. The authorized ID code may be hardwired into the machine control unit with jumper module 258, and microcomputer 250 may compare the ID code received from the remote transcription unit to the hard-wired ID code by an appropriate code to decoder 257.

If an appropriate ID code corresponding to a remote transcription unit which has authorized access to the machine control unit is not detected, the NO branch 550 of decision block 545, shown in FIG. 6A, is followed. An invalid code results in the release of the telephone line by microcomputer 250, at 551, and a return is made to the start block 540 so that another call may be received.

In the event that a valid identification code has been detected by microcomputer 250, the YES branch 552 of decision block 545 is followed. Another sequence of acknowledge tones is sent over the telephone line at 553, which is a signal to the remote transcription unit that access is being allowed to the dictation recorders controlled by the machine control unit.

After the acknowledge tones have been sent, microcomputer 250 selects a dictation recorder having recorded dictation to be transcribed, either by selection by the operator of the remote transcription unit with a sequence of dual tone commands, or by alternatively polling the recorders to determine which dictation recorders have recorded dictation. At 554, the operator may enter a sequence of digits on key pad 20 which is transmitted by the remote transcription unit over the telephone line to the machine control unit to select a particular one of the dictation recorders.

In the event that a particular machine has not been requested at 554, the machine control unit alternatively may poll the dictation recorders to determine if there is dictation available for transcription. Or, the operator may input a sequence of digits which selects the monitor feature. Microcomputer 250 performs a polling function by placing a code corresponding to a particular dictation recorder on data bus 251 and thence to lines A, B, C and D from latch 260 so that the recorder is seized by selector 410 (FIG. 3C). The work load status signal WL of the selected recorder, which appears at the output of multiplexer 403, may be read through buffer 273 over data bus 251 by microcomputer 250. The sequence may be repeated for each dictation recorder until a recorder is seized contains dictation requiring transcription. Simultaneously, the busy status line BSY of the selected dictation recorder may be read by microcomputer 250, which provides an indication that the selected dictation recorder is presently being used to record dictation, and is therefore unavailable for transcription of the recorded contents.

Returning to FIG. 6A, in the event that all dictation recorders provide an indication that they are busy when polled, decision block 555 is exited on the YES branch 556. A sequence of tones having a predetermined duration corresponding to a busy signal may be sent at 557, which provides an audible indication to the operator of the remote transcription unit that all recorders are busy. It is at this point that the monitor feature could be selected by the operator. The telephone line is released at 558, and a return is made to the start block 540 so that the operator may access a different machine control unit, may attempt to gain access to the machine control unit later, or may await a call from the machine control unit by the monitor feature.

In the event that at least one recorder has provided an indication that it is not busy and has dictation available for transcription, the NO branch 560 of decision block 555 is followed (FIG. 6A). The recorder which indicated that dictation was available is seized at 561 (FIG. 6B). Then, a sequence of tones corresponding to the number of the dictation recorder seized is sent to the remote transcription unit, and the identification code of the remote transcription unit is passed to the selected recorder (for record-keeping purposes), at 562. This informs the operator that the dictation recorder which has been seized may be identified by the number of tones heard.

It will now be understood that the operator of the remote transcription unit may transcribe dictation from the selected recorder by depressing the listen switch, the fast forward switch, or the rewind switch, or may alternatively select various functions by depressing digits on key pad 20. The dual tone pairs corresponding to the desired functions are transmitted by the remote transcription unit and received and decoded by the machine control unit. The step at which commands are received and decoded by microcomputer 250 is indicated at 563 in FIG. 6B.

A certain sequence of dual tones received from the remote transcription unit may correspond to a command to terminate the transcription of dictation and release the machine control unit. At decision block 564, if a sequence of tones is received corresponding to the command to "hang up", the YES branch 565 is followed, and the telephone line is released by microcomputer 250 at 566. Microcomputer 250 then returns to the start block 540 (FIG. 6A), and the machine control unit is ready to receive another call.

In the event that a code corresponding to a command to release a telephone line is not received, the NO branch 570 of decision block 564 is followed. At decision block 571, microcomputer 250 may read the output of dual tone decoder 275 through buffer 273 (FIG. 3B) to determine whether a sequence of dual tones corresponding to a validly selectable function has been received. In the event that an appropriate sequence has not been received, the NO branch 572 is followed from block 571, and a return is made to block 563, where commands may be received and decoded anew. If a valid function code is received at block 571, the YES branch 573 is followed from block 571, and the desired function is provided at 574. These functions, as recited above, include setting the variable speed of playback, setting the amount of recall, selecting the monitor feature, or selecting a command to listen, rewind, or fast forward.

It may be recalled from the discussion above that any commands which require the motion of the recording media must be continuously accompanied by the guard tone generated by the remote transcription unit in order for the media motion function to continue. Consequently, if a media motion function such as recall, listen or fast forward has been selected at 575, the machine control unit tests to determine whether guard tone is being received at 576. It may be recalled that microcomputer 250 senses the presence of the guard tone by reading the T1 input on line 390 (FIGS. 3A, 3B), which is the output of phase lock loop 389. If the guard tone is sensed while a media motion function is being performed, the YES branch 580 of decision block 576 is followed and the recording media motion function is continued to be provided at 581, and microcomputer 250 returns to decision block 576. It will be understood that testing for the presence of the guard tone is continually made during the provision of any recording media motion function.

If the microcomputer 250 fails to detect the presence of the guard tone during a recording media motion function at 576, the NO branch is followed at 582, and the function is immediately terminated at 583. Thus, it will be appreciated that any recording media motion function is immediately terminated when microcomputer 250 fails to detect the presence of the guard tone. It will be further appreciated that the requirement that the guard tone accompany a media motion function prevents the runaway recall, fast forward, or listen advance of a selected dictation recorder if the telephone connection between the remote transcription unit and the machine control unit is interrupted for some reason. Advantageously, if communication has been interrupted between the remote transcription unit and the machine control unit, the operator may re-access the machine control unit and begin transcription anew at the point at which communication was interrupted without being forced to fast forward or rewind at random in an attempt to determine the point at which transcription was interrupted. After a recorder media motion function has been terminated at 583, the machine control unit returns to block 563 where other commands may be received and decoded in accordance with the discussion above.

The foregoing has been a description of the structure and operation of the preferred embodiment of the present invention of a remote transcription system comprising a remote transcription unit and a machine control unit. It will be appreciated that other alternative functions and sequences of operation of the remote transcription unit and the machine control unit may be performed by the structure described while still remaining within the scope of the present invention. It will be appreciated by those skilled in the art that the apparatus of the present invention may be arranged so that the functional operation of the system can be readily modified by simply changing a few connections which are readily accessible or by changing the sequence of operation of the microcomputers. Thus, it will be appreciated that the foregoing description has been merely illustrative, and that the present invention is limited solely by the appended claims.

I claim:

1. In a dictation recorder including means for selectively initiating one of a plurality of recording media motion functions in response to receipt of a particular one of a plurality of distinct start control signals, the improvement comprising:

guard tone signal generator means responsive to each of said start control signals for continuously providing a guard tone signal during the provision of each of said motion functions; and means responsive to said guard tone signal for continuing a selected one of said plurality of said motion functions only during the presence of said guard tone signal.

2. In a dictation recorder including means for of selectively initiating one of a plurality of a recording media motion functions in response to receipt of a particular one of a plurality of distinct start control signals from a remote location, the improvement comprising:

guard tone signal means at said remote location responsive to said each of start control signals for continuously providing a guard tone signal during the provision of each of said motion functions;

communication means for transmitting said start control signals and said guard tone signal from said remote location to said recorder; and means associated with said recorder responsive to said guard tone signal for continuing a selected one of said plurality of said motion functions only during the presence of said guard tone signal.

3. In a dictation recorder including means for providing a selected one of a plurality of recording media motion functions in response to receipt of a particular one of a plurality of start control signals, said one of said start control signals being provided in response to the actuation by an operator of a particular one of a plurality of control switches at a remote location, the improvement comprising:

guard tone signal means located at said remote location and responsive to each of said start control signals for continuously providing a guard tone signal during the actuation of said particular one of said control switches;

communication means for transmitting said start control signals and said guard tone signal from said remote location to said recorder;

first recorder control means responsive to said start control signals for initiating said selected one of said motion functions; and second recorder control means responsive to said guard tone signal for continuing said selected one of said motion functions only during the presence of said guard tone signal;

whereby when said operator deactuates said particular one of said control switches or said communication means fails to transmit said guard tone signal from said remote location to said recorder, said motion function terminates.

4. A system for the remote transcription by an operator of the recorded contents of a dictation recorder, comprising:

a dictation recorder operative to provide recorded dictation signals in response and subsequent to a listen control signal;

a remote transcription station located remotely from said recorder, said station comprising listen control means for providing said listen control signal in response to actuation by the operator, audio signal means for converting said recorded dictation signals into audible sound for the operator, and guard signal means responsive to said listen control means for continuously providing a guard signal during the actuation by the operator of said listen control means; and signal transmitting means linking said dictation recorder and said remote transcription station for transmitting said listen control signal and said guard signal from said remote transcription system to said dictation recorder and further for transmitting said recorded dictation signals from said dictation recorder to said remote transcription station, said dictation recorder operative to provide said recorded dictation signals only during the presence of said guard signal.

5. The system of claim 4, further comprising:

first recorder listen control means responsive to said listen control signal for initiating a listen mode recording media motion function to provide said recorded dictation signals, and second recorder control means responsive to said guard signal for continuing said recording media motion function only the presence of said guard signal.

6. The system of claim 4, further comprising:

recall control means associated with said dictation recorder responsive to said listen control signal and said guard signal for providing a predetermined amount of recording media rewind when said guard signal terminates subsequent to said listen control signal.

7. The system of claim 6, further comprising:

variable recall amount selection means associated with said remote transcription station for providing a recall amount signal in response to actuation by the operator, said recall amount signal corresponding to a variably selectable predetermined amount of recording media rewind desired by the operator, and wherein said recall control means is responsive to said recall amount signal for providing said variably selectable predetermined amount of recording media rewind, and wherein said signal transmitting means transmits said recall amount signal from said remote transcription station to said dictation recorder.

8. The system of claim 7, further comprising:

recall amount signal storage means associated with said recall control means for storing said recall amount signal, whereby said recall control means provides an amount of recording media rewind corresponding to said recall amount signal stored in said storage means.

9. The system of claim 4, further comprising:

fast forward control means operative to provide a fast forward control signal in response to actuation by said operator, and wherein said dictation recorder is operative to initiate a fast forward recording media motion function in response to said fast forward control signal, said guard signal means is responsive to said fast forward control means for continuously providing said guard signal during the actuation by said operator of said fast forward control means, said signal transmitting means is operative to transmit said fast forward control signal from said remote transcription station to said dictation recorder, and said dictation recorder is operative to continue said fast forward recording media motion function only during the presence of said guard signal.

10. The system of claim 4, further comprising:

rewind control means operative to provide a rewind control signal in response to actuation by said operator, and wherein said dictation recorder is operative to initiate a rewind recording media motion function in response to said rewind control signal, said guard signal means is responsive to said rewind control means for continuously providing said guard signal during the actuation by said operator of said rewind control means, said signal transmitting means is operative to transmit said rewind control signal from said remote transcription station to said dictation recorder, and said dictation recorder is operative to continue said rewind recording media motion function only during the presence of said guard signal.

11. The system of claim 4, further comprising:

variable speed selection means associated with said remote transcription station for providing a variable speed signal in response to actuation by the operator, said variable speed signal corresponding to a variably selectable predetermined speed of recording playback desired by the operator;

variable speed control means associated with said dictation recorder responsive to said variable speed signal for providing said variably selectable predetermined speed of recording playback;

and wherein said signal transmitting means transmits said variable speed signal from said remote transcription station to said dictation recorder.

12. The system of claim 11, further comprising:

variable speed signal storage means associated with said variable speed control means for storing said variable speed signal, whereby said variable speed control means provides a speed of recording playback corresponding to said variable speed signal stored in said storage means.

13. In a dictation recorder including means for playing back recorded dictation signals over a telephone line to an operator at a remote location in response to the provision by said operator of a listen control function, and means for automatically providing an amount of recording media rewind subsequent to said provision by said operator of said listen control function, the improvement comprising:

variable recall amount selection means in said remote location for providing a variable recall amount signal in response to actuation by said operator, said variable recall amount signal corresponding to a selectively variable predetermined amount of recording media rewind;

communication means for transmitting said variable recall amount signal from said remote location to said recorder over said telephone line;

signal storage means at said recorder for storing said variable recall amount signal; and automatic variable recall control means associated with said recorder responsive to said variable amount recall signal for automatically providing an amount of recording media rewind corresponding to said desired predetermined amount of rewind stored in said storage means subsequent to each provision by said operator of said listen control function.

14. In a dictation recorder including means for playback of recorded dictation at a variably selectable speed of playback upon the actuation by an operator at a remote location of a control switch, said improvement comprising:

variable speed selection means in said remote location for providing a variable speed signal in response to actuation by said operator, said variable speed signal corresponding to a desired predetermined speed of playback of said recorder;

communication means for transmitting said variable speed signal from said remote location to said recorder;

signal storage means for storing said variable speed signal; and variable speed control means associated with said recorder responsive to said variable speed signal for providing the speed of playback of said recorder at said desired predetermined speed of playback stored in said storage means.

15. In a system for the remote transcription by an operator at a remote location of the recorded contents of a dictation recorder over a telephone line, a work available monitoring improvement comprising:

dictation available detection means associated with said recorder for providing a dictation ready signal when said dictation recorder contains dictation ready to be transcribed;

automatic telephone dialing means responsive to said dictation ready signal for calling a predetermined telephone number associated with said remote location on said telephone line;

automatic telephone answering means at said remote location responsive to an incoming call on said telephone line for seizing said telephone line to receive signals;

means associated with said recorder for transmitting said dictation ready signal from said recorder to said remote location over said telephone line after said answering means has seized said telephone line; and operator signal means at said remote location responsive to said dictation ready signal received over said telephone line for providing an operator signal for the operator indicating that said recorder has dictation ready to be transcribed.

16. The improvement of claim 15, wherein said operator signal means provides said operator signal for a first predetermined time period, and further comprising operator response means for connecting the operator over said telephone line to said recorder in response to actuation by the operator within said first predetermined time period.

17. The improvement of claim 16, wherein said operator signal means is responsive to an absence of said actuation of said operator response means within said first predetermined time period to release said telephone line and said automatic telephone dialing means is responsive to call said predetermined telephone number a second predetermined time period after release of said telephone line.

18. A system for the remote transcription by an operator of the recorded contents of a dictation recorder, comprising:

a communications link;

a remote transcription unit connected to one end of said communication link, comprising:

switch means operative to provide a selected one of a plurality of control signals in response to actuation by the operator;

first communication means for transmitting and receiving signals over said communications link;

audio signal means for converting dictation signals received from a dictation recorder over said communications link into audible sound for the operator;

guard signal means for continuously providing a guard signal to said communications means during the actuation by the operator of switch means corresponding to a desired recording media motion function in a dictation recorder;

function signal means for providing function signals corresponding to desired preselected functions for a dictation recorder;

microcomputer control means responsive to said control signals for:

switching dictation signals from said first communication means to said audio signal means, turning on said guard signal in response to a first preselected one of said control signals, switching a predetermined function signal from said function signal means to said first communication means for transmission over said communications link in response to a second preselected one of said control signals, and connecting and disconnecting said first communications means with said communications link and providing a call signal over said communications link in response to a third preselected one of said control signals; and a machine control unit connected to the other end of said communications link, comprising:

second communication means for transmitting and receiving signals over said communications link;

dictation recorder control means for controlling the functions of a dictation recorder;

call signal detection means for detecting the receipt of said call signal over said communications link;

guard signal detection means for detecting the receipt of said guard signal over said communications link;

function signal detection means for detecting the receipt of said function signals over said communications link; and second microcomputer control means for:

connecting said second communications means to said communications link in response to receipt of said call signal;

switching dictation signals from a dictation recorder to said second communication means for transmission over said communications link;

causing said dictation recorder control means to provide a preselected function on a dictation recorder in response to detection of a predetermined function signal; and terminating a recording media motion function which has been initiated by said dictation recorder control means if said guard signal detection means fails to detect said guard signal during the provision of said recorder media motion function.

* * * * *